(12) United States Patent
Schwarz et al.

(10) Patent No.: US 12,366,179 B2
(45) Date of Patent: *Jul. 22, 2025

(54) GAS TURBINE ENGINE WITH HIGH SPEED LOW PRESSURE TURBINE SECTION AND BEARING SUPPORT FEATURES

(71) Applicant: RTX CORPORATION, Farmington, CT (US)

(72) Inventors: Frederick M. Schwarz, Glastonbury, CT (US); Gabriel L. Suciu, Glastonbury, CT (US); William K. Ackermann, East Hartford, CT (US); Daniel Bernard Kupratis, Wallingford, CT (US); Michael E. McCune, Colchester, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/420,862

(22) Filed: Jan. 24, 2024

(65) Prior Publication Data

US 2024/0401500 A1    Dec. 5, 2024

Related U.S. Application Data

(63) Continuation of application No. 18/104,375, filed on Feb. 1, 2023, now Pat. No. 11,913,349, which is a (Continued)

(51) Int. Cl.
*F02C 7/36*     (2006.01)
*F01D 15/12*    (2006.01)
(Continued)

(52) U.S. Cl.
CPC .......... *F01D 25/164* (2013.01); *F01D 15/12* (2013.01); *F01D 25/162* (2013.01); *F02C 3/107* (2013.01);
(Continued)

(58) Field of Classification Search
CPC .......... F01D 25/164; F01D 15/12; F02C 7/36; F02C 3/107; F05D 2260/40311
See application file for complete search history.

(56) References Cited

U.S. PATENT DOCUMENTS

| 791,754 A | 6/1905 | Danzenbaker |
|---|---|---|
| 1,090,416 A | 3/1914 | Roth |

(Continued)

FOREIGN PATENT DOCUMENTS

| CA | 2789325 A1 | 4/2013 |
|---|---|---|
| CA | 2789465 A1 | 4/2013 |

(Continued)

OTHER PUBLICATIONS

U.S. Appl. No. 13/558,605, filed Jul. 26, 2012, 18 pages.
(Continued)

*Primary Examiner* — Steven M Sutherland
(74) *Attorney, Agent, or Firm* — Carlson, Gaskey & Olds, P.C.

(57) ABSTRACT

A gas turbine engine according to an example of the present disclosure includes, among other things, propulsor means, first compression means, second compression means, reduction means for reducing a rotational speed of an output that drives the propulsor means relative to an input, first expansion means, and second expansion means. The reduction means includes an epicyclic gear system with a gear reduction. The gear system is straddle-mounted by first and second bearings on opposite sides of the gear reduction relative to an engine longitudinal axis.

18 Claims, 4 Drawing Sheets

Related U.S. Application Data continuation of application No. 16/227,271, filed on Dec. 20, 2018, now Pat. No. 11,598,223, which is a continuation of application No. 15/478,706, filed on Apr. 4, 2017, now Pat. No. 10,287,914, which is a continuation-in-part of application No. 13/446,510, filed on Apr. 13, 2012, now Pat. No. 9,611,859, which is a continuation-in-part of application No. 13/363,154, filed on Jan. 31, 2012, now abandoned.

(60) Provisional application No. 61/619,124, filed on Apr. 2, 2012.

(51) Int. Cl.
*F01D 25/16* (2006.01)
*F02C 3/107* (2006.01)
*F02C 7/06* (2006.01)
*F02C 7/20* (2006.01)
*F02K 3/06* (2006.01)

(52) U.S. Cl.
CPC ............... *F02C 7/06* (2013.01); *F02C 7/20* (2013.01); *F02C 7/36* (2013.01); *F02K 3/06* (2013.01); *F05D 2220/32* (2013.01); *F05D 2240/60* (2013.01); *F05D 2260/40311* (2013.01)

(56) References Cited

U.S. PATENT DOCUMENTS

| | | |
|---|---|---|
| 2,258,792 A | 10/1941 | New |
| 2,608,821 A | 9/1952 | Hunsaker |
| 2,620,157 A | 12/1952 | Walton et al. |
| 2,748,623 A | 6/1956 | Hill |
| 2,936,655 A | 5/1960 | Peterson et al. |
| 3,021,731 A | 2/1962 | Stoeckicht |
| 3,033,002 A | 5/1962 | William et al. |
| 3,111,005 A | 11/1963 | Howell et al. |
| 3,172,717 A | 3/1965 | Brasher et al. |
| 3,185,857 A | 5/1965 | Johnson |
| 3,194,487 A | 7/1965 | Tyler et al. |
| 3,250,512 A | 5/1966 | Alexander et al. |
| 3,287,906 A | 11/1966 | McCormick |
| 3,352,178 A | 11/1967 | Lindgren et al. |
| 3,412,560 A | 11/1968 | Gaubatz |
| 3,434,288 A | 3/1969 | Petrie et al. |
| 3,526,092 A | 9/1970 | Steel et al. |
| 3,527,054 A | 9/1970 | Hemsworth et al. |
| 3,620,020 A | 11/1971 | Halliwell et al. |
| 3,664,612 A | 5/1972 | Skidmore et al. |
| 3,673,802 A | 7/1972 | Krebs et al. |
| 3,713,748 A | 1/1973 | Langley |
| 3,722,215 A | 3/1973 | Zhdanov et al. |
| 3,729,957 A | 5/1973 | Petrie et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark et al. |
| 3,843,277 A | 10/1974 | Ehrich |
| 3,861,139 A | 1/1975 | Jones |
| 3,876,330 A | 4/1975 | Pearson et al. |
| 3,886,737 A | 6/1975 | Grieb |
| 3,892,358 A | 7/1975 | Gisslen |
| 3,932,058 A | 1/1976 | Harner et al. |
| 3,935,558 A | 1/1976 | Miller et al. |
| 3,986,720 A | 10/1976 | Knudsen et al. |
| 3,988,889 A | 11/1976 | Chamay et al. |
| 4,005,575 A | 2/1977 | Scott et al. |
| 4,084,861 A | 4/1978 | Greenberg et al. |
| 4,090,416 A | 5/1978 | Hicks |
| 4,130,872 A | 12/1978 | Haloff |
| 4,136,286 A | 1/1979 | O'Halloran et al. |
| 4,201,513 A | 5/1980 | Sales |
| 4,220,171 A | 9/1980 | Ruehr et al. |
| 4,221,114 A | 9/1980 | Wilde et al. |
| 4,233,555 A | 11/1980 | Roche |
| 4,240,250 A | 12/1980 | Harris |
| 4,251,987 A | 2/1981 | Adamson |
| 4,275,557 A | 6/1981 | Marvin et al. |
| 4,284,174 A | 8/1981 | Salvana et al. |
| 4,289,360 A | 9/1981 | Zirin |
| 4,304,522 A | 12/1981 | Newland |
| 4,405,892 A | 9/1983 | Staerzl |
| 4,446,696 A | 5/1984 | Sargisson et al. |
| 4,448,019 A | 5/1984 | Klees |
| 4,463,553 A | 8/1984 | Boudigues |
| 4,478,551 A | 10/1984 | Honeycutt, Jr. et al. |
| 4,611,464 A | 9/1986 | Hetzer et al. |
| 4,649,114 A | 3/1987 | Miltenburger et al. |
| 4,660,376 A | 4/1987 | Johnson |
| 4,693,616 A | 9/1987 | Rohra et al. |
| 4,696,156 A | 9/1987 | Burr et al. |
| 4,722,357 A | 2/1988 | Wynosky |
| 4,808,076 A | 2/1989 | Jarmon et al. |
| 4,809,498 A | 3/1989 | Giffin, III et al. |
| 4,825,644 A | 5/1989 | Bubello et al. |
| 4,825,723 A | 5/1989 | Martin |
| 4,827,712 A | 5/1989 | Coplin |
| 4,879,624 A | 11/1989 | Jones et al. |
| 4,885,912 A | 12/1989 | Nakhamkin |
| 4,887,424 A | 12/1989 | Geidel et al. |
| 4,909,031 A | 3/1990 | Grieb |
| 4,916,894 A | 4/1990 | Adamson et al. |
| 4,947,642 A | 8/1990 | Grieb et al. |
| 4,969,325 A | 11/1990 | Adamson et al. |
| 4,979,362 A | 12/1990 | Vershure, Jr. |
| 5,010,729 A | 4/1991 | Adamson et al. |
| 5,058,617 A | 10/1991 | Stockman et al. |
| 5,074,109 A | 12/1991 | Mandet et al. |
| 5,081,832 A | 1/1992 | Mowill |
| 5,102,379 A | 4/1992 | Pagluica et al. |
| 5,141,400 A | 8/1992 | Murphy et al. |
| 5,160,251 A | 11/1992 | Ciokajlo |
| 5,168,208 A | 12/1992 | Schultz et al. |
| 5,182,464 A | 1/1993 | Woodworth et al. |
| 5,252,905 A | 10/1993 | Wills et al. |
| 5,307,622 A | 5/1994 | Ciokajlo et al. |
| 5,317,877 A | 6/1994 | Stuart |
| 5,361,580 A | 11/1994 | Ciokajlo et al. |
| 5,388,964 A | 2/1995 | Ciokajlo et al. |
| 5,390,068 A | 2/1995 | Schultz et al. |
| 5,433,674 A | 7/1995 | Sheridan et al. |
| 5,447,411 A | 9/1995 | Curley et al. |
| 5,466,198 A | 11/1995 | McKibbin et al. |
| 5,486,533 A | 1/1996 | Mishra et al. |
| 5,486,553 A | 1/1996 | Deaner et al. |
| 5,520,512 A | 5/1996 | Walker et al. |
| 5,524,847 A | 6/1996 | Brodell et al. |
| 5,539,027 A | 7/1996 | Deaner et al. |
| 5,607,165 A | 3/1997 | Bredemeyer |
| 5,625,276 A | 4/1997 | Scott et al. |
| 5,634,767 A | 6/1997 | Dawson |
| 5,677,060 A | 10/1997 | Terentieva et al. |
| 5,694,027 A | 12/1997 | Satake et al. |
| 5,729,059 A | 3/1998 | Kilroy et al. |
| 5,734,255 A | 3/1998 | Thompson et al. |
| 5,740,668 A | 4/1998 | Fujiwara et al. |
| 5,754,033 A | 5/1998 | Thomson |
| 5,778,659 A | 7/1998 | Duesler et al. |
| 5,806,303 A | 9/1998 | Johnson |
| 5,857,836 A | 1/1999 | Stickler et al. |
| 5,886,890 A | 3/1999 | Ishida et al. |
| 5,915,917 A | 6/1999 | Eveker et al. |
| 5,949,153 A | 9/1999 | Tison et al. |
| 5,971,706 A | 10/1999 | Glista et al. |
| 5,975,841 A | 11/1999 | Lindemuth et al. |
| 5,985,470 A | 11/1999 | Spitsberg et al. |
| 6,073,439 A | 6/2000 | Beaven et al. |
| 6,104,171 A | 8/2000 | Dvorsky et al. |
| 6,172,717 B1 | 1/2001 | Ebihara |
| 6,205,432 B1 | 3/2001 | Gabbard et al. |
| 6,209,311 B1 | 4/2001 | Itoh et al. |

(56) References Cited

U.S. PATENT DOCUMENTS

| | | |
|---|---|---|
| 6,223,616 B1 | 5/2001 | Sheridan |
| 6,260,351 B1 | 7/2001 | Delano et al. |
| 6,307,622 B1 | 10/2001 | Lewis |
| 6,315,815 B1 | 11/2001 | Spadaccini et al. |
| 6,318,070 B1 | 11/2001 | Rey et al. |
| 6,339,927 B1 | 1/2002 | DiPietro, Jr. |
| 6,378,308 B1 | 4/2002 | Pfluger |
| 6,381,948 B1 | 5/2002 | Klingels |
| 6,387,456 B1 | 5/2002 | Eaton, Jr. et al. |
| 6,506,022 B2 | 1/2003 | Bunker |
| 6,517,341 B1 | 2/2003 | Brun et al. |
| 6,555,929 B1 | 4/2003 | Eaton et al. |
| 6,607,165 B1 | 8/2003 | Manteiga et al. |
| 6,619,030 B1 | 9/2003 | Seda et al. |
| 6,631,310 B1 | 10/2003 | Leslie |
| 6,639,331 B2 | 10/2003 | Schultz |
| 6,647,707 B2 | 11/2003 | Dev |
| 6,653,821 B2 | 11/2003 | Kern et al. |
| 6,657,416 B2 | 12/2003 | Kern et al. |
| 6,663,530 B2 | 12/2003 | Poulin et al. |
| 6,668,629 B1 | 12/2003 | Leslie |
| 6,669,393 B2 | 12/2003 | Schilling |
| 6,708,482 B2 | 3/2004 | Seda |
| 6,709,492 B1 | 3/2004 | Spadaccini et al. |
| 6,732,502 B2 | 5/2004 | Seda et al. |
| 6,735,954 B2 | 5/2004 | MacFarlane et al. |
| 6,763,653 B2 | 7/2004 | Orlando et al. |
| 6,792,759 B2 | 9/2004 | Rollins, III |
| 6,814,541 B2 | 11/2004 | Evans et al. |
| 6,847,297 B2 | 1/2005 | Lavoie et al. |
| 6,855,089 B2 | 2/2005 | Poulin et al. |
| 6,883,303 B1 | 4/2005 | Seda |
| 6,892,115 B2 | 5/2005 | Berkcan et al. |
| 6,895,741 B2 | 5/2005 | Rago et al. |
| 6,909,942 B2 | 6/2005 | Andarawis et al. |
| 6,914,763 B2 | 7/2005 | Reedy |
| 6,966,174 B2 | 11/2005 | Paul |
| 6,985,784 B2 | 1/2006 | Vandevanter et al. |
| 6,999,291 B2 | 2/2006 | Andarawis et al. |
| 7,019,495 B2 | 3/2006 | Patterson |
| 7,021,042 B2 | 4/2006 | Law |
| 7,043,340 B2 | 5/2006 | Papallo et al. |
| 7,055,306 B2 | 6/2006 | Jones et al. |
| 7,104,918 B2 | 9/2006 | Mitrovic |
| 7,144,349 B2 | 12/2006 | Mitrovic |
| 7,195,446 B2 | 3/2007 | Seda et al. |
| 7,216,475 B2 | 5/2007 | Johnson |
| 7,219,490 B2 | 5/2007 | Dev |
| 7,223,197 B2 | 5/2007 | Poulin et al. |
| 7,269,938 B2 | 9/2007 | Moniz et al. |
| 7,299,621 B2 | 11/2007 | Bart et al. |
| 7,301,738 B2 | 11/2007 | Pearlman et al. |
| 7,328,580 B2 | 2/2008 | Lee et al. |
| 7,334,392 B2 | 2/2008 | Moniz et al. |
| 7,338,259 B2 | 3/2008 | Shah et al. |
| 7,374,403 B2 | 5/2008 | Decker et al. |
| 7,393,182 B2 | 7/2008 | Matheny |
| 7,406,830 B2 | 8/2008 | Valentian et al. |
| 7,409,819 B2 | 8/2008 | Henry |
| 7,451,592 B2 | 11/2008 | Taylor et al. |
| 7,513,102 B2 | 4/2009 | Moniz et al. |
| 7,513,103 B2 | 4/2009 | Orlando et al. |
| 7,557,544 B2 | 7/2009 | Heinz et al. |
| 7,591,754 B2 | 9/2009 | Duong et al. |
| 7,594,404 B2 | 9/2009 | Somanath et al. |
| 7,600,370 B2 | 10/2009 | Dawson |
| 7,610,763 B2 | 11/2009 | Somanath et al. |
| 7,626,259 B2 | 12/2009 | Wehrly, Jr. et al. |
| 7,631,484 B2 | 12/2009 | Giffin et al. |
| 7,632,064 B2 | 12/2009 | Somanath et al. |
| 7,656,060 B2 | 2/2010 | Algrain |
| 7,662,059 B2 | 2/2010 | McCune |
| 7,665,293 B2 | 2/2010 | Wilson, Jr. et al. |
| 7,685,808 B2 | 3/2010 | Orlando et al. |
| 7,694,505 B2 | 4/2010 | Schilling |
| 7,704,178 B2 | 4/2010 | Sheridan et al. |
| 7,716,914 B2 | 5/2010 | Schilling |
| 7,721,549 B2 | 5/2010 | Baran |
| 7,762,086 B2 | 7/2010 | Schwark |
| 7,765,786 B2 | 8/2010 | Klingels et al. |
| 7,797,946 B2 | 9/2010 | Kumar et al. |
| 7,806,651 B2 | 10/2010 | Kennepohl et al. |
| 7,815,417 B2 | 10/2010 | Somanath et al. |
| 7,816,813 B2 | 10/2010 | Yagudayev et al. |
| 7,824,305 B2 | 11/2010 | Duong et al. |
| 7,828,682 B2 | 11/2010 | Smook |
| 7,832,193 B2 | 11/2010 | Orlando et al. |
| 7,841,163 B2 | 11/2010 | Welch et al. |
| 7,841,165 B2 | 11/2010 | Orlando et al. |
| 7,871,247 B2 | 1/2011 | Shah et al. |
| 7,882,683 B2 | 2/2011 | Studer et al. |
| 7,882,693 B2 | 2/2011 | Schilling |
| 7,926,259 B2 | 4/2011 | Orlando et al. |
| 7,926,260 B2 | 4/2011 | Sheridan et al. |
| 7,959,532 B2 | 6/2011 | Suciu et al. |
| 7,997,868 B1 | 8/2011 | Liang |
| 8,001,763 B2 | 8/2011 | Grabowski et al. |
| 8,002,520 B2 | 8/2011 | Dawson et al. |
| 8,015,798 B2 | 9/2011 | Norris et al. |
| 8,015,828 B2 | 9/2011 | Moniz et al. |
| 8,061,969 B2 | 11/2011 | Durocher et al. |
| 8,075,261 B2 | 12/2011 | Merry et al. |
| 8,083,472 B2 | 12/2011 | Maguire |
| 8,083,474 B2 | 12/2011 | Hashimoto et al. |
| 8,091,371 B2 | 1/2012 | Durocher et al. |
| 8,104,265 B2 | 1/2012 | Kupratis |
| 8,106,633 B2 | 1/2012 | Dozier et al. |
| 8,166,748 B2 | 5/2012 | Schilling |
| 8,172,717 B2 | 5/2012 | Lopez et al. |
| 8,191,352 B2 | 6/2012 | Schilling |
| 8,205,432 B2 | 6/2012 | Sheridan |
| 8,297,916 B1 | 10/2012 | McCune et al. |
| 8,297,917 B1 | 10/2012 | McCune et al. |
| 8,561,383 B2 | 10/2013 | Suciu et al. |
| 8,640,336 B2 | 2/2014 | Sheridan et al. |
| 8,747,055 B2 | 6/2014 | McCune et al. |
| 8,756,908 B2 | 6/2014 | Sheridan et al. |
| 8,770,922 B2 | 7/2014 | McCune et al. |
| 8,834,099 B1 | 9/2014 | Topol et al. |
| 8,899,915 B2 | 12/2014 | McCune et al. |
| 9,133,729 B1 | 9/2015 | McCune et al. |
| 9,239,012 B2 | 1/2016 | McCune et al. |
| 9,297,917 B2 | 3/2016 | Mah et al. |
| 9,523,422 B2 | 12/2016 | McCune et al. |
| 9,540,948 B2 | 1/2017 | Schwarz et al. |
| 9,631,558 B2 | 4/2017 | McCune et al. |
| 9,752,511 B2 | 9/2017 | McCune et al. |
| 10,107,378 B2 | 10/2018 | Miller et al. |
| 10,301,968 B2 | 5/2019 | McCune et al. |
| 10,590,802 B2 | 3/2020 | McCune et al. |
| 11,022,044 B1 | 6/2021 | Spruce |
| 2003/0163983 A1 | 9/2003 | Seda et al. |
| 2003/0163984 A1 | 9/2003 | Seda et al. |
| 2003/0235523 A1 | 12/2003 | Lyubovsky et al. |
| 2005/0025627 A1 | 2/2005 | Harding et al. |
| 2005/0138914 A1 | 6/2005 | Paul |
| 2005/0226720 A1 | 10/2005 | Harvey et al. |
| 2005/0241292 A1 | 11/2005 | Taylor et al. |
| 2005/0279100 A1 | 12/2005 | Graziosi et al. |
| 2006/0029894 A1 | 2/2006 | Zinn et al. |
| 2006/0101804 A1 | 5/2006 | Stretton |
| 2006/0130456 A1 | 6/2006 | Suciu et al. |
| 2006/0177302 A1 | 8/2006 | Berry |
| 2006/0179818 A1 | 8/2006 | Merchant |
| 2006/0228206 A1 | 10/2006 | Decker et al. |
| 2006/0236675 A1 | 10/2006 | Weiler |
| 2006/0244327 A1 | 11/2006 | Kundel |
| 2006/0288686 A1 | 12/2006 | Cherry et al. |
| 2007/0012026 A1 | 1/2007 | Dev |
| 2007/0022735 A1 | 2/2007 | Henry et al. |
| 2007/0084183 A1 | 4/2007 | Moniz et al. |
| 2007/0084189 A1 | 4/2007 | Moniz et al. |
| 2007/0087892 A1 | 4/2007 | Orlando et al. |
| 2007/0125066 A1 | 6/2007 | Orlando et al. |

(56) References Cited

U.S. PATENT DOCUMENTS

| | | |
|---|---|---|
| 2007/0214795 A1 | 9/2007 | Cooker et al. |
| 2007/0225111 A1 | 9/2007 | Duong et al. |
| 2007/0262661 A1 | 11/2007 | Ai |
| 2007/0265133 A1 | 11/2007 | Smook |
| 2008/0003096 A1 | 1/2008 | Kohli et al. |
| 2008/0022653 A1 | 1/2008 | Schilling |
| 2008/0044276 A1 | 2/2008 | McCune et al. |
| 2008/0056888 A1 | 3/2008 | Somanath et al. |
| 2008/0097813 A1 | 4/2008 | Collins et al. |
| 2008/0098713 A1 | 5/2008 | Orlando et al. |
| 2008/0098714 A1 | 5/2008 | Orlando et al. |
| 2008/0098718 A1 | 5/2008 | Henry et al. |
| 2008/0112791 A1 | 5/2008 | Lee et al. |
| 2008/0116009 A1 | 5/2008 | Sheridan et al. |
| 2008/0148707 A1 | 6/2008 | Schilling |
| 2008/0148881 A1 | 6/2008 | Moniz et al. |
| 2008/0149445 A1 | 6/2008 | Kern et al. |
| 2008/0184694 A1 | 8/2008 | Guimbard et al. |
| 2008/0190095 A1 | 8/2008 | Baran |
| 2008/0276621 A1 | 11/2008 | Somanath et al. |
| 2008/0304974 A1 | 12/2008 | Marshall et al. |
| 2008/0317588 A1 | 12/2008 | Grabowski et al. |
| 2009/0007569 A1 | 1/2009 | Lemmers, Jr. et al. |
| 2009/0053058 A1 | 2/2009 | Kohlenberg et al. |
| 2009/0056306 A1 | 3/2009 | Suciu et al. |
| 2009/0056343 A1 | 3/2009 | Suciu et al. |
| 2009/0074565 A1 | 3/2009 | Suciu et al. |
| 2009/0080700 A1 | 3/2009 | Lau et al. |
| 2009/0090096 A1 | 4/2009 | Sheridan |
| 2009/0092480 A1 | 4/2009 | Kupratis |
| 2009/0092494 A1 | 4/2009 | Cairo et al. |
| 2009/0094961 A1 | 4/2009 | Stern |
| 2009/0097967 A1 | 4/2009 | Smith et al. |
| 2009/0145102 A1 | 6/2009 | Roberge et al. |
| 2009/0151317 A1 | 6/2009 | Norris et al. |
| 2009/0183512 A1 | 7/2009 | Suciu et al. |
| 2009/0229242 A1 | 9/2009 | Schwark |
| 2009/0245997 A1 | 10/2009 | Hurwitz et al. |
| 2009/0266912 A1 | 10/2009 | Gukeisen |
| 2009/0288384 A1 | 11/2009 | Granitz et al. |
| 2009/0293445 A1 | 12/2009 | Ress, Jr. |
| 2009/0304518 A1 | 12/2009 | Kodama et al. |
| 2009/0314881 A1 | 12/2009 | Suciu et al. |
| 2009/0317229 A1 | 12/2009 | Suciu et al. |
| 2009/0320488 A1 | 12/2009 | Gilson et al. |
| 2010/0005778 A1 | 1/2010 | Chaudhry |
| 2010/0005810 A1 | 1/2010 | Jarrell et al. |
| 2010/0007207 A1 | 1/2010 | Peuser |
| 2010/0080700 A1 | 4/2010 | Venter |
| 2010/0089019 A1 | 4/2010 | Knight et al. |
| 2010/0105516 A1 | 4/2010 | Sheridan et al. |
| 2010/0126141 A1 | 5/2010 | Schilling |
| 2010/0132376 A1 | 6/2010 | Durocher et al. |
| 2010/0132377 A1 | 6/2010 | Durocher et al. |
| 2010/0135786 A1 | 6/2010 | Manteiga et al. |
| 2010/0148396 A1 | 6/2010 | Xie et al. |
| 2010/0154384 A1 | 6/2010 | Schilling |
| 2010/0162683 A1 | 7/2010 | Grabowski et al. |
| 2010/0212281 A1 | 8/2010 | Sheridan |
| 2010/0218478 A1 | 9/2010 | Merry et al. |
| 2010/0218483 A1 | 9/2010 | Smith |
| 2010/0219779 A1 | 9/2010 | Bradbrook |
| 2010/0301617 A1 | 12/2010 | Lundbladh |
| 2010/0326050 A1 | 12/2010 | Schilling et al. |
| 2010/0331139 A1 | 12/2010 | McCune |
| 2011/0056208 A1 | 3/2011 | Norris et al. |
| 2011/0081237 A1 | 4/2011 | Durocher et al. |
| 2011/0106510 A1 | 5/2011 | Poon |
| 2011/0116510 A1 | 5/2011 | Breslin et al. |
| 2011/0130246 A1 | 6/2011 | McCune et al. |
| 2011/0149624 A1 | 6/2011 | Yamanaka |
| 2011/0159797 A1 | 6/2011 | Beltman et al. |
| 2011/0165983 A1 | 7/2011 | Fox |
| 2011/0208400 A1 | 8/2011 | Lickfold et al. |
| 2011/0286836 A1 | 11/2011 | Davis |
| 2011/0293423 A1 | 12/2011 | Bunker et al. |
| 2012/0007431 A1 | 1/2012 | Jang et al. |
| 2012/0017603 A1 | 1/2012 | Bart et al. |
| 2012/0124964 A1 | 5/2012 | Hasel et al. |
| 2012/0171018 A1 | 7/2012 | Hasel et al. |
| 2012/0263578 A1 | 10/2012 | Davis et al. |
| 2012/0291449 A1 | 11/2012 | Adams et al. |
| 2013/0011547 A1 | 1/2013 | Girard et al. |
| 2013/0115476 A1 | 5/2013 | Castle et al. |
| 2013/0186058 A1 | 7/2013 | Sheridan et al. |
| 2013/0192191 A1 | 8/2013 | Schwarz et al. |
| 2013/0192196 A1 | 8/2013 | Suciu et al. |
| 2013/0192200 A1 | 8/2013 | Kupratis et al. |
| 2013/0192201 A1 | 8/2013 | Kupratis et al. |
| 2013/0192258 A1 | 8/2013 | Kupratis et al. |
| 2013/0192263 A1 | 8/2013 | Suciu et al. |
| 2013/0192266 A1 | 8/2013 | Houston et al. |
| 2013/0195621 A1 | 8/2013 | Schwarz et al. |
| 2013/0195648 A1 | 8/2013 | Schwarz et al. |
| 2013/0219913 A1 | 8/2013 | McCune et al. |
| 2013/0223986 A1 | 8/2013 | Kupratis et al. |
| 2013/0224003 A1 | 8/2013 | Kupratis et al. |
| 2013/0255219 A1 | 10/2013 | Schwarz et al. |
| 2013/0259650 A1 | 10/2013 | Schwarz et al. |
| 2013/0259653 A1 | 10/2013 | Schwarz et al. |
| 2013/0259654 A1 | 10/2013 | Kupratis et al. |
| 2013/0283819 A1 | 10/2013 | Schwarz et al. |
| 2013/0287575 A1 | 10/2013 | McCune et al. |
| 2013/0292196 A1 | 11/2013 | Ooka |
| 2013/0310213 A1 | 11/2013 | Matsuoka et al. |
| 2013/0318998 A1 | 12/2013 | Schwarz et al. |
| 2013/0331223 A1 | 12/2013 | McCune et al. |
| 2013/0331224 A1 | 12/2013 | McCune et al. |
| 2013/0336791 A1 | 12/2013 | McCune et al. |
| 2014/0020404 A1 | 1/2014 | Sheridan et al. |
| 2014/0109548 A1 | 4/2014 | Virkler |
| 2014/0130479 A1 | 5/2014 | Schwarz et al. |
| 2014/0133958 A1 | 5/2014 | McCune et al. |
| 2014/0140819 A1 | 5/2014 | McCune et al. |
| 2014/0174056 A1 | 6/2014 | Suciu et al. |
| 2014/0196472 A1 | 7/2014 | Kupratis et al. |
| 2014/0234079 A1 | 8/2014 | McCune et al. |
| 2014/0271135 A1 | 9/2014 | Sheridan et al. |
| 2015/0089959 A1 | 4/2015 | Merry et al. |
| 2015/0096303 A1 | 4/2015 | Schwarz et al. |
| 2015/0121844 A1 | 5/2015 | Kupratis et al. |
| 2016/0032826 A1 | 2/2016 | Rued et al. |
| 2017/0122426 A1 | 5/2017 | Miller et al. |
| 2017/0335718 A1 | 11/2017 | McCune et al. |
| 2021/0172378 A1 | 6/2021 | Spruce |

FOREIGN PATENT DOCUMENTS

| | | |
|---|---|---|
| CN | 1952367 A | 4/2007 |
| EP | 0253548 A2 | 1/1988 |
| EP | 0791383 A1 | 8/1997 |
| EP | 1142850 A1 | 10/2001 |
| EP | 1340902 A2 | 9/2003 |
| EP | 1403500 A1 | 3/2004 |
| EP | 1577491 A1 | 9/2005 |
| EP | 1607574 A1 | 12/2005 |
| EP | 1703085 A2 | 9/2006 |
| EP | 1712738 A2 | 10/2006 |
| EP | 1777370 A2 | 4/2007 |
| EP | 1921253 A2 | 5/2008 |
| EP | 1921290 A2 | 5/2008 |
| EP | 2071139 A2 | 6/2009 |
| EP | 2071153 A2 | 6/2009 |
| EP | 2192269 A2 | 6/2010 |
| EP | 2192273 A2 | 6/2010 |
| EP | 2270315 A2 | 1/2011 |
| EP | 2270361 A2 | 1/2011 |
| EP | 2532841 A2 | 12/2012 |
| EP | 2532858 A2 | 12/2012 |
| EP | 2551488 A2 | 1/2013 |
| EP | 2551489 A2 | 1/2013 |
| EP | 2737180 A1 | 6/2014 |
| EP | 2809575 A1 | 12/2014 |
| EP | 2809931 A1 | 12/2014 |

(56) References Cited

FOREIGN PATENT DOCUMENTS

| | | |
|---|---|---|
| EP | 2809934 A2 | 12/2014 |
| EP | 2809939 A2 | 12/2014 |
| EP | 2809953 A1 | 12/2014 |
| EP | 2811120 A1 | 12/2014 |
| EP | 2841718 A2 | 3/2015 |
| EP | 2896785 A1 | 7/2015 |
| EP | 2949881 A1 | 12/2015 |
| EP | 2532841 B1 | 4/2016 |
| EP | 3032084 A1 | 6/2016 |
| EP | 2809931 B1 | 7/2016 |
| EP | 3070315 A1 | 9/2016 |
| EP | 3070316 A1 | 9/2016 |
| FR | 2563865 A1 | 11/1985 |
| FR | 2912181 A1 | 8/2008 |
| GB | 745239 A | 2/1956 |
| GB | 1516041 A | 6/1978 |
| GB | 2041090 A | 9/1980 |
| GB | 2419639 A | 5/2006 |
| GB | 2426792 A | 12/2006 |
| GB | 2419639 B | 9/2009 |
| JP | S57171032 A | 10/1982 |
| JP | 2014156861 A | 8/2014 |
| WO | 2007038674 A1 | 4/2007 |
| WO | 2010030724 A1 | 3/2010 |
| WO | 2013102191 A1 | 7/2013 |
| WO | 2013116257 A1 | 8/2013 |
| WO | 2013116262 A1 | 8/2013 |
| WO | 2013154636 A1 | 10/2013 |
| WO | 2014018142 A2 | 1/2014 |
| WO | 2014028085 A2 | 2/2014 |
| WO | 2014047040 A1 | 3/2014 |
| WO | 2015031143 A1 | 3/2015 |
| WO | 2015156885 A2 | 10/2015 |

OTHER PUBLICATIONS

U.S. Appl. No. 13/629,681, filed Sep. 28, 2012, 38 pages.
U.S. Appl. No. 13/645,606, filed Oct. 5, 2012, 36 pages.
U.S. Appl. No. 13/645,626, filed Oct. 5, 2012, 34 pages.
U.S. Appl. No. 13/645,665, filed Oct. 5, 2012, 34 pages.
U.S. Appl. No. 13/645,773, filed Oct. 5, 2012, 35 pages.
U.S. Appl. No. 13/645,807, filed Oct. 5, 2012, 34 pages.
U.S. Appl. No. 13/719,620, filed Dec. 19, 2012, 16 pages.
U.S. Department of Transportation: Federal Aviation Administration Advisory Circular. Calibration test, endurance test, and teardown inspection for turbine engine certification. Dated Apr. 13, 2006. pp. 1-41 and Appendices.
U.S. Department of Transportation: Federal Aviation Administration Advisory Circular, Engine Overtorque Test, Calibration Test, Endurance Test, and Teardown Inspection for Turbine Engine Certification, dated Mar. 9, 2015, pp. 1-37 and Appendices.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E00064EN. Dated: Nov. 24, 2006, pp. 1-5.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Velex, P. (2012). On the modelling of spur and helical gear dynamic behaviour. In. Dr. M. Gokcek (Ed), Mechanical engineering, InTech, 2012. DOI: 10.5772/36157.

Walsh, P. (2004). Gas turbine performance: 5.11.6 Radial flow turbines versus axial flow turbines. John Wiley and Sons. Blackwell Science, Second Edition. p. 214.
Walsh, P.P. and Fletcher, P. (2004). Gas turbine performance, 2nd Edition. Oxford, UK: Blackwell Science. pp. 1-658.
Walsh P.P., et al., "Gas Turbine Performance," Second Edition, Blackwell Science Ltd, Oxford, UK, 2004, p. 206.
Warwick, G. (2007). Civil engines: Pratt & Whitney gears up for the future with GTF. Flight International, Nov. 2007. Retrieved Jun. 14, 2016 from: https://www.flightglobal.com/news/articles/civil-engines-pratt-amp-whitney-gears-up-for-the-future-with-219989/.
Warwick G., "Textron Lycoming LF507: Engine for Change," Flight International, Aug. 31, 1993, pp. 39-41.
Waters, M.H. and Schairer, E.T. (1977). Analysis of turbofan propulsion system weight and dimensions. NASA Technical Memorandum. Jan. 1977. pp. 1-65.
Web Article, GE Aviation, GEnx-28 first engine to test, Jan. 28, 2012, Retrieved from: http://www.geaviation.com/engines/commercial/genx/2b_fett.html, 1 page.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Welch G.E. (2010). Assessment of aerodynamic challenges of a variable-speed power turbine for large civil tilt-rotor application. Prepared for 66th Annual Forum and Technology Display. May 11-13, 2010. NASA/TM-2010-216758. pp. 1-15.
Welch, G.E., Mcvetta, A.B., Stevens, M.A., Howard, S.A., Giel, P.W., Ameri, A.A., To, W., et al. (2012). Variable-speed power-turbine research at Glenn Research Center. Prepared for the 68th Annual Forum and Technology Display. May 1-3, 2012. NASA/TM-2012-217605. pp. 1-23.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF 502: plugging the turbofan gap. Flight International, p. 237-241, Jan. 30, 1982.
"Wide-chord fan—12 years of development", Aircraft Engineering and Aerospace Technology, Jul. 1987, vol. 59, Issue 7, pp. 10-11, Retrieved Jul. 31, 2008 from: https://doi.org/10.1108/eb036471.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Wikipedia. Airbus A220. Retrieved from: https://en.wikipedia.org/wiki/Airbus_A220.
Wikipedia. Boeing 737 next generation. Retrieved from: https://en.wikipedia.org/wiki/Boeing_737_Next_Generation.
Wikipedia. CFM International CFM56. Retrieved from: https://en.wikipedia.org/wiki/CFM_International_CFM56.
Wikipedia. Lycoming ALF 502. Retrieved from: https://en.wikipedia.org/wiki/Lycoming_ALF_502.
Wikipedia. Mitsubishi SpaceJet. Retrieved from: https://en.wikipedia.org/wiki/Mitsubishi_SpaceJet.
Wikipedia. Stiffness. Retrieved Jun. 28, 2018 from: https://en.wikipedia.org/wiki/Stiffness.
Wikipedia. Torsion spring. Retrieved Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Wilfert, G., Kriegl, B., Scheugenplug, H., Bernard, J., Ruiz, X., and Eury, S. (2005). Clean—validation of a high efficient low NOx core, a GTF high speed turbine and an integration of a recuperator in an environmental friendly engine concept. 41st AIAA/ASME/SAE/ASEE Joint Propulsion Conference. Tucson, AZ. Jul. 10-13, 2005. p. 1-11.
Wilfert, G., Kriegl, B., Wald, L., and Johanssen, O. (2005). Clean—Validation of a GTF high speed turbine and integration of heat exchanger technology in an environmental friendly engine concept. International Society on Air Breathing Engines. Feb. 2005. pp. 1-8.

(56) References Cited

OTHER PUBLICATIONS

Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Wrong C. B., "An Introduction to the JT15D Engine," ASME, 96-GT-119, 1969, 6 pages.
Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Youtube Video, "Pure Power PW1000G Engine: Customer Testimonials", published Jul. 26, 2010 (-seconds 43-63) available at https:www.youtube.com/watch?v=vgQgEftEd8c on Aug. 9, 2018.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
Kurzke, J. (2001). GasTurb 9: A program to calculate design and off-design performance of gas turbines. Retrieved from: https://www.scribd.com/document/92384867/GasTurb9Manual.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air 2009, Orlando, Florida. pp. 145-153.
Kurzke, J. (2012). GasTurb 12: Design and off-design performance of gas turbines. Retrieved from: https://www.scribd.com/document/153900429/GasTurb-12.
Lacaze J., et al., "Directionally Solidified Materials: Nickel-Base Superalloys for Gas Turbines," Textures and Microstructures, 1990, vol. 13, pp. 1-14.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Le Borzec, R. (1992). Reducteurs de vitesse a engrenages. Techniques de l'Igenieur. Nov. 10, 1992. pp. 1-36.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
Lee, K.N. (2000). Current status of environmental barrier coatings for Si-Based ceramics. Surface and Coatings Technology 133-134, 2000. pp. 1-7.
Letter from the Opponent for European Patent Application No. 2811120 (14155460.0) mailed Feb. 15, 2019 by Safran Aircraft Engines.
Letter from the Opponent (Safran) for European Patent 2809939 (13786893.1) dated Aug. 13, 2020.
Letter from the Opponent (Safran) for European Patent 2949881 (15175203.74) dated Mar. 25, 2021.
Levintan, R.M. (1975). Q-Fan demonstrator engine. Journal of Aircraft. vol. 12( 8). Aug. 1975. pp. 658-663.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W. et al. (1995). Advanced subsonic airplane design economics studies. NASA CR-195443. Apr. 1995. pp. 1-187.
Litt, J.S. (2018). Sixth NASA Glenn Research Center propulsion control and diagnostics (PCD) workshop. NASA/CP-2018-219891. Apr. 1, 2018. pp. 1-400.
Lord, W.K., MacMartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
Lynwander P., "Gear Drive Systems: Design and Application," American Lohmann Corporation, New Jersey, 1983, Marcel Dekker Inc., NY and Basel, GE-1018.008, paragraphs 2-4, p. 327.
Macisaac, B. and Langston, R. (2011). Gas turbine propulsion systems. Chichester, West Sussex: John Wiley & Sons, Ltd. pp. 260-265.
Mancuso, J.R. and Corcoran, J.P. (2003). What are the differences in high performance flexible couplings for turbomachinery Proceedings of the Thirty-Second Turbomachinery Symposium. 2003. pp. 189-207.
Manual. Student's Guide to Learning SolidWorks Software. Dassault Systemes—SolidWorks Corporation. pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.
Mattingly, J.D. (1996). Elements of gas turbine propulsion. New York, New York: McGraw-Hill, Inc. pp. 8-15.
Mattingly J.D., "Aircraft Engine Design," American Institute of Aeronautics and Astronautics Inc, 2nd Edition, Jan. 2002, pp. 292-322.
Mattingly J.D., "Elements of Gas Turbine Propulsion", New York, New York: McGraw-Hill, Inc. preface, 1996, pp. 719-720, 727-731, 735-738, 928-929, and 936-937.
Mattingly J.D., et al., "Aircraft Engine Design", American Institute of Aeronautics and Astronautics Inc, 2nd ed, 2002, XP008175104, ISBN 1-56347-538-3, pp. 292-310.
Mattingly, J.D, Heiser, W.H., Boyer, K.M., Haven, B.A., and Pratt, D.T. (2002). Aircraft engine design. American Institute of Aeronautics and Astronautics Inc, 2nd ed, 2002, XP008175104, ISBN 1-56347-538-3, pp. 290-292.
Mattingly, Textbook, XP008174593, pp. 292.
Mavris, D.N., Schutte, J.S. (2016). Application of deterministic and probabilistic system design methods and enhancements of conceptual design tools for ERA project final report. NASA/CR-2016-219201. May 1, 2016. pp. 1-240.
Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mccracken, R.C. (1979). Quiet short-haul research aircraft familiarization document. NASA-TM-81149. Nov. 1, 1979. pp. 1-76.
Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.

(56) References Cited

OTHER PUBLICATIONS

Mcmillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Meier N. (2005) Civil Turbojet/Turbofan Specifications. Retrieved from http://jet-engine.net/civtfspec.html.
Merriam-Webster's collegiate dictionary, 10th Ed. (2001). p. 1125-1126.
Merriam-Webster's collegiate dictionary, 11th Ed. (2009). p. 824.
Meyer, A.G. (1988). Transmission development of Textron Lycoming's geared fan engine. Technical Paper. Oct. 1988. pp. 1-12.
Middleton, P. (1971). 614: VFW's jet feederliner. Flight International, Nov. 4, 1971. p. 725, 729-732.
Misel, O.W. (1977). QCSEE main reduction gears test program. NASA CR-134669. Mar. 1, 1977. pp. 1-222.
Moxon, J. How to save fuel in tomorrow's engines. Flight International. Jul. 30, 1983. 3873(124). pp. 272-273.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Munt, R. (1981). Aircraft technology assessment: Progress in low emissions engine. Technical Report. May 1981. pp. 1-171.
Nagendra S., et al., "Optimal rapid multidisciplinary response networks: Rapiddisk," Structural and Multidisciplinary Optimization, Springer, Berlin, DE, vol. 29, No. 3, Mar. 1, 2005, pp. 213-231.
Nanocor Technical Data for Epoxy Nanocomposites using Nanomer 1.30E Nanoclay. Nnacor, Inc. Oct. 2004.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference. pp. 1-10.
CFM International CFM56, Jane's Aero-Engines, Janes by IHS Markit, Jan. 31, 2011, 36 pages.
Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Co-pending U.S. Appl. No. 14/160,601, inventor Roberge et al., filed Jun. 11, 2009.
Coppinger, R. (2007). MTU Aero Engines designs High-Speed Turbine for P&W's GTF Geared Turbofan. Flight International. [accessed Oct. 13, 2017 at https://www.flightglobal.com/news/articles/mtu-aero-engines-designs-high-speed-turbine-for-pw-217631/].
Coy, Peter. The little gear that could reshape the jet engine: A simple idea's almost 30-year, $10 billion journey to the aircraft mainstream. Bloomberg Business. Oct. 15, 2015. p. 1-4.
Cramoisi, G. Ed. (2012). Death in the Potomac: The crash of Air Florida Flight 90. Air Crash Investigations. Accident Report NTSB/AAR-82-8. p. 45-47.
Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.

Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-12.
Daly, M. Ed. (2010). Jane's Aero-Engine. Issue Twenty-seven. Mar. 2010. p. 633-636.
Damerau, J. (2014) What is the mesh stiffness of gears Screen shot of query submitted by Vahid Dabbagh, answered by Dr. Jochan Damerau, Research General Managerat Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B for the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-617.
Decision Denying Institution of Inter Partes Review, *General Electric Company*, Petitioner v. *United technologies Corp.*, Patent Owner, IPR2017-00522, U.S. Pat. No. 8,899,915, Entered Jun. 23, 2017, pp. 1-18.
Decision Institution of Inter Partes Review. *General Electric Company*, Petitioner v. *United Technologies Corporation*, Patent Owner. IPR2018-01442. U.S. Pat. No.9,695,751. Entered Feb. 21, 2019. pp. 1-25.
Decision of Technical Board of Appeal in European Patent Application No. 13743042.7 (2809931), Appellant Raytheon Technologies Corporation, Appellant Safran Aircraft Engines, mailed Nov. 21, 2022.
Decision of the Opposition Division, European Patent No. 2949882 (Application No. 15175205.2) dated Nov. 26, 2018.
Decision of the Opposition Division for European Patent No. 2809931, dated Nov. 26, 2018, 12 pages.
Decision of the Opposition Division for European Patent No. 2811120 (14155460.0), dated Jan. 15, 2020.
Decision on Appeal for U.S. Appl. No. 13/446,194, dated Mar. 30, 2016, Appeal 2014-002599.
Decision on Appeal for U.S. Appl. No. 13/446,510, dated Feb. 26, 2016, Appeal 2014-001580.
Decision on Appeal for U.S. Appl. No. 13/558,605, dated Mar. 30, 2016, Appeal 2014-004476.
Decision Revoking EP Patent 3045864 (App 161593124) Jul. 22, 2022.
Decision Revoking EP Patent 3098396 (App 161740519) Jul. 22, 2022.
Decision Revoking European Patent EP2809939 (13786893.1) by the Opposition Division mailed Aug. 5, 2021.
Decision to Deny Institution—Case IPR2018-01171, U.S. Pat. No. 8,297,916B1, *General Electric Company*, Petitioner v, *United Technologies Corporation*, Patent owner, Entered Nov. 29, 2018, 17 pages.
Decision to Deny Institution—Case IPR2018-01172, U.S. Pat. No. 8,297,916B1, *General Electric Company*, Petitioner v, *United Technologies Corporation*, Patent owner, Entered Nov. 29, 2018, 58 pages.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Courtney H. Bailey, in re U.S. Pat No. 8,511,605, Executed Jul. 19, 2016, pp. 1-4.

(56) References Cited

OTHER PUBLICATIONS

Declaration of Dr. Magdy Attia, in re U.S. Pat. No. 8,313,280, Executed Oct. 21, 2016, pp. 1-88.
Declaration of Dr. Magdy Attia, in re U.S. Pat. No. 8,517,668, Executed Dec. 8, 2016, pp. 1-81.
Declaration of Dr. Magdy Attia in re U.S. Pat. No. 9,695,751, Executed Jul. 12, 2018, pp. 1-114 and appendices.
Declaration of John Eaton, Ph.D. in re U.S. Pat. No. 8,689,568, Executed Mar. 28, 2016, pp. 1-87.
Declaration of Magdy Attia in re U.S. Pat. No. 8,899,915, Executed Dec. 13, 2016, pp. 1-71.
Declaration of Raymond Drago., In re U.S. Pat. No. 8,297,916, IPR2018-01172, Executed May 29, 2018, pp. 1-115.
Declaration of Raymond Drago, In re U.S. Pat. No. 8,899,915 under 37 C.F.R. 1.68. Executed Dec. 9, 2016, pp. 1-38.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Preliminary Opinion of the Opposition Division in the opposition to patent EP2949882, dated Mar. 13, 2019, 12 pages.
Preliminary Opinion of the Opposition Division in the Opposition to Patent EP3051078, dated Apr. 16, 2019.
Preliminary Opinion of the Opposition Division Issued in the Framework of the Opposition Procedure Against Patent EP2949881 (Application No. 15175203.7).
Preliminary Opinion of the Opposition Division Issued in the Framework of the Opposition Procedure Against Patent EP2949882 (Application No. 15175205.2), dated Mar. 13, 2019.
Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.
Princeton, "Composite Materials", https://www.princeton.edu/-humcomp/bikes/design/desi_30.htm, on Oct. 9, 2019, 1 page.
Principal Brief. *Raytheon Technologies Corporation* v. *General Electric Company.* Inter Partes Review No. IPR2018-01442. Filed Aug. 7, 2020. pp. 1-59, appendices 1-98, and 60-1.
Prior Art Direct Drive Engines Statement, 1 page.
Priority document U.S. Appl. No. 14/160,601 dated Jan. 22, 2014.
Product Brochure, BR710, Rolls-Royce, Copyright 2008, pp. 1-4.
Product Brochure. Garrett TFE731. Allied Signal. Copyright 1987. pp. 1-24.
Product Brochure, "TFE731 Engines: A new generation meeting your highest expectations for reliability, cost of ownership and performance", Allied Signal Aerospace, Copyright 1996. pp. 1-10.
Product Brochure. The ALF 502R turbofan: technology, ecology, economy. Avco Lycoming Textron.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade design. (1975). NASA-CR-134840. May 1, 1975. pp. 1-51.
QCSEE under-the-wing engine composite fan blade final design test report. (1977). NASA-CR-135046. Feb. 1, 1977. pp. 1-55.
QCSEE under-the-wing engine composite fan blade preliminary design test report. (1975). NASA-CR-134846. Sep. 1, 1975. pp. 1-56.
QCSEE under-the-wing engine digital control system design report. (1978). NASA-CR-134920. Jan. 1, 1978. pp. 1-309.
Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Rauch, D. (1972). Design study of an air pump and integral lift engine ALF-504 using the Lycoming 502 core. Prepare for NASA. Jul. 1972. pp. 1-182.
*Raytheon Techs. Corp.* V. *General Electric Co.,* 993 F.3d 1374 (Fed. Cir. 2021).
Read, B. (2014). Powerplant revolution. AeroSpace. May 2014. pp. 28-31.
Red Aviation. Part or Material Certification Form for various engine components. Dated Apr. 5, 2017.
Reply to an Examination Report in Opposition Porceedings in European Patent Application No. 16174051.9 (3098396) by Rolls-Royce PLC dated Apr. 11, 2023.
Reply to an Examination Report in Opposition Proceedings in European Patent Application No. 16159312.4 (3045684) by Rolls-Royce PLC dated Apr. 6, 2023.
Reply to Appeal in the opposition of European Patent Application No. 13786893.1 (2809939) by Rolls-Royce plc dated Apr. 21, 2022.
Reply to Appeal in the opposition of European Patent Application No. 13786893.1 (2809939) by Safran dated May 4, 2022.
Reply to the Observations for European Patent No. EP3097275 (15777258.3) dated Aug. 18, 2021.
Request for Opinion as to Validity for European Patent No. EP2809922 (13778330.4), dated Feb. 6, 2019 by Rolls Royce, 16 pages.
Request for Opinion as to Validity for European Patent No. EP2809922 (13778330.4), dated Feb. 14, 2019 by Rolls Royce, 16 pages.
Request for Opinion as to Validity of European Patent No. 2809922B1 (13778330.4) Observations-in-Reply mailed Apr. 3, 2019 by Rolls-Royce.
Request for Opinion filed for European Patent No. EP2532841B1 by Rolls Royce granted Apr. 27, 2016, dated Nov. 7, 2018.
Request for Opinion filed for European Patent No. EP2532858B1 by Rolls Royce granted Oct. 19, 2016, dated Nov. 7, 2018.
Request for Opinion filed for European Patent No. EP2737180B1 by Rolls Royce granted Apr. 13, 2016, dated Jul. 11, 2018.
Reshotko, M., Karchmer, A., Penko, P.F. and Mcardle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Response from the Holder. European Patent Application No. 14155460.0 (2811120) dated Dec. 1, 2016.
Response from the Holder. European Patent Application No. 14155460.0 (2811120) dated Jun. 10, 2015.
Response from the Holder. European Patent Application No. 14155460.0 (2811120) dated Nov. 23, 2015.
Response to Appeal for European Patent No. 2809931 (13743042.7) mailed Aug. 22, 2019.
Response to Holder's Response European Patent No. EP2949882 by Safran Aircraft Engines dated Mar. 12, 2019. [with English translation].

(56) References Cited

OTHER PUBLICATIONS

Response to Observations by Patantee filed for European Patent No. EP2532841B1 by Rolls Royce granted Apr. 27, 2016, dated Jan. 18, 2019.
Response to Observations by Patantee filed for European Patent No. EP2532858B1 by Rolls Royce granted Oct. 19, 2016, dated Jan. 18, 2019.
Response to Observations by Patantee filed for European Patent No. EP2737180B1 by Rolls Royce granted Apr. 13, 2016, dated Jul. 18, 2018.
Response to Opposition for European Patent No. EP2949882 (EP Application No. 15175205.2) dated Nov. 26, 2018.
Response to Opposition—opposed by Rolls Royce. EP Patent No. 3045684 Application No. 16159312.4 Jul. 5, 2021.
Response to Opposition—opposed by Rolls Royce EP Patent No. 3098396 Application No. 16174051.9 Jul. 5, 2021.
Response to Statement of Grounds of Appeal from the Patent Holder for European Patent No. 2809931 by Safran Aircraft Engine dated Aug. 21, 2019. [with English translation].
Response to the Observations Filed by Patent Holder for European Patent No. EP2809922, dated Apr. 29, 2020.
Response to the Summons of Oral Proceedings for European Patent No. EP2949882 by Rolls-Royce, dated Oct. 9, 2019.
Response to the Summons of Oral Proceedings for European Patent No. EP2949882 by Safran, dated Oct. 9, 2019.
Response to the Summons of Oral Proceedings for European Patent No. EP3051078 by Rolls-Royce, dated Oct. 17, 2019.
Response to the Summons to Oral Proceedings in European Patent Application No. 15175203.7(EP2949881) by Rolls-Royce plc dated Mar. 25, 2021. pp. 1-9.
Response to the Summons to Oral Proceedings in EuropeanPatent Application No. 15175203.7 (EP2949881) by Safran dated Mar. 25, 2021.pp. 1-11.
Rethinking jet engines to make commercial aviation less of a threat to the climate (and the human respiratory system). Fortune. Retrieved Sep. 29, 2016 from: http://beta.fortune.com/change-the-world/united-technologies-8.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Reynolds, C.N., "Advanced prop-fan engine technology (APET) single- and counter-rotation gearbox/pitch change mechanism," Prepared for NASA, NASA CR-168114 (vol. II), Jul. 1985, pp. 1-175.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
Rolls-Royce M45H. Jane's Aero-engines, Aero-engines—Turbofan. Feb. 24, 2010.
"Rolls-Royce Trent 900," Jane's Aero-Engines, Jane's by IHS Markit, Feb. 8, 2012.
"Rolls-Royce Trent XWB," Jane's Aero-Engines, Jane's by IHS Markit, Mar. 6, 2012.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France, pp. 1-595.
Roux E., "Turbofan and turbojet engines database handbook," Editions Elodie Roux, Blagnac: France, 2007, pp. 41-43 and 464-469.
Roux E., "Turbofan and turbojet engines database handbook", Editions Elodie Roux. Blagnac: France, 2007, pp. 41-42, pp. 465, pp. 468-469.
Sabnis, J. (2010). The PW1000G PurePower new engine concept and its impact on MRO. Av Week Engine MRO Forum. Dec. 1, 2010. pp. 1-45.
Sabnis J.S. (2005). Emissions and noise—Next frontier for aircraft engine technologies. Presented at the AIAA/ AAAF Aircraft Noise and Emissions Reduction Symposium. Monterey, California, USA. May 24-26, 2005.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaber Reinhold, "Numerische Auslegung und Simulation von Gasturbinen," Dec. 14, 2000, 115 pages.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley & Sons, Inc. pp. 722-726 and 764-771.
Sessions R., "Turbo Hydra-Malic 350 Handbook", 1985, The Berkley Publishing Group, pp. 24-25.
Shah, D.M. (1992). MoSi2 and other silicides as high temperature structural materials. Superalloys 1992. The Minerals, Metals, & Materials Society. pp. 409-422.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singapore Search Report and Written Opinion for Application No. 10201401514U, mailed May 26, 2017, 15 pages.
Singapore Search Report and Written Opinion for Application No. SG10201706005S, dated Feb. 15, 2018, 11 pages.
Singapore Search Report and Written Opinion for Application No. SG11201402667Q dated May 19, 2015.
Singapore Search Report and Written Opinion for Application No. SG11201402824R dated Apr. 19, 2016.
Singapore Search Report and Written Opinion for Application No. SG11201402942Q dated Mar. 4, 2015, 28 pages.
Singapore Search Report and Written Opinion for Application No. SG11201403011R, dated Nov. 17, 2015, 14 pages.
Singapore Search Report and Written Opinion for Application No. SG11201403015W dated Jun. 9, 2015.
Singapore Search Report and Written Opinion for Application No. SG11201403118S, dated Apr. 20, 2015, 29 pages.
Singapore Search Report for Application No. SG11201403615Q dated Jan. 4, 2016.
Singh, A. (2005). Application of a system level model to study the planetary load sharing behavior. Jounal of Mechanical Design. vol. 127. May 2005. pp. 469-476.
Singh, Avinash, Load Sharing Behavior in EpicyclicGears:Physical Explanation and Generalized Formulation. Mechanism and MachineTheory, vol. 45. 2010, 20 pgs.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp. 1-263.
2003 NASA seal/secondary air system workshop. (2003). NASA/CP-2004-212963/vol. 1. Sep. 1, 2004. pp. 1-408.
(2012). Gas Power Cycle—Jet Propulsion Technology, A case study. Machine Design Magazine. Nov. 5, 1998. Retrieved from: http://machinedesign.com/content/pw8000-0820.
About GasTurb. Retrieved Jun. 26, 2018 from: http://gasturb.de/about-gasturb.html.
Adams, et al., "The World's Hugest Jet Engine Is Wider Than a 737's Fuselage", Apr. 28, 2016, www.wired.com/2016/04/worlds-hugest-jet-engine-wider-737s-fuselage/ accessed on Apr. 28, 2016, 5 pages.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

(56) References Cited

OTHER PUBLICATIONS

Aerospace Information Report. (2008). Advanced ducted propulsor in-flight thrust determination. SAE International AIR5450. Aug. 2008. p. 1-392.

Agarwal, B.D and Broutman, L.J. (1990). Analysis and performance of fiber composites, 2nd Edition. John Wiley & Sons, Inc. New York: New York. pp. 1-11, 13-23, 26-33, 50-51, 56-58, 60-61, 64-71, 87-89, 324-329, 436-437.

AGMA Information Sheet, "Double Helical Epicyclic Gear Units," ANSI-AGMA 940-A09, Approved Jan. 6, 2009, pp. 1-22.

AGMA Standard (1997). Design and selection of components for enclosed gear drives. lexandria, VA: American Gear Manufacturers Association. pp. 1-48.

AGMA Standard (1999) Flexible couplings—Mass elastic properties and other characteristics. Alexandria, VA: American Gear Manufacturers Association. pp. 1-46.

AGMA Standard (2006). Design manual for enclosed epicyclic gear drives. Alexandria, VA: American Gear Manufacturers Association. pp. 1-104.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Annex to Communication 94(3) EPC—EP3296526—Feb. 27, 2020 (Application No. 17199484.1).

Annex to Communication 94(3) EPC—Patent EP3296526—Feb. 1, 2019 (Application No. 17199484.1).

Annex to the Notice on Article 94(3) EPC issued by the Examination Division for European Patent Application No. 13837107.5 mailed Jan. 25, 2019.

Annexe Mesures—Methodologie de mesure et de calcul, cited in: Notice of Opposition for European Patent No. 2809932 mailed Oct. 1, 2018.

Annexe Mesures—Methodologie de mesure et de calcul. STF495M-4 and STF495M-5. Cited in: Documents cited by Rolls-Royce in anticipation of Oral Proceedings for Opposition of European Patent No. 2809932 dated Jan. 20, 2020.

Annotation of Edkins D.P., et al., "TF34 Turbofan Quiet Engine Study," Final Report prepared for NASA, NASA-CR-120914, Jan. 1, 1972, p. 92.

Annotation of Gray D.E., "Energy Efficient Engine Preliminary Design and Integration Studies," Prepared for NASA, NASA CR-135396, Nov. 1978, p. 70.

Appeal from the United States Patent and Trademark Office,Patent Trial and Appeal Board in No. IPR2018-01442. *Raytheon TechnologiesCorporation* v. *General Electric Company.* Decided Apr. 16, 2021. pp. 1-14.

Appellant's Reply Brief. *Raytheon Technologies Corporation* v. *General Electric Company.* Inter Partes Review No. IPR2018-01442. Filed Oct. 26, 2020. pp. 1-32.

ASME International Gas Turbine Institute, "Trends in the Global Energy Supply and Implications for the Turbomachinery Industry", Global Gas Turbine News, Apr. 2013, vol. 53, Issue. 2, pp. 49-53.

Attestation by Didier Escure signed Oct. 20, 2020 as filed in the Opposition of European Patent Application No. 13786893.1 (2809939) by Safran Aircraft Engines dated May 4, 2022.

Attestation for Didier Escure Signed Sep. 17, 2018, cited in: Notice of Opposition for European Patent No. 2809932 mailed Oct. 1, 2018.

Attestation of Philippe Pellier signed Apr. 12, 2017, cited in: Notice of Opposition by Safran for European Patent No. EP 2809931 dated Apr. 20, 2017.

August R., "Dynamics of Planetary Gear Trains", Jun. 1984, NASA Contractor Report 3793, pp. 13-16.

Avco Lycoming Divison. ALF 502L Maintenance Manual. Apr. 1981. pp. 1-118.

Aviadvigatel D-110. Jane's Aero-engines, Aero-engines—Turbofan. Jun. 1, 2010.

Aviation Investigation Report A14Q0068. Uncontained turbine rotor failure. Transportation Safety Board of Canada. May 29, 2014. pp. 1-53.

Awker, R.W. (1986). Evaluation of propfan propulsion applied to general aviation. NASA CR-175020. Mar. 1, 1986. pp. 1-140.

Baker, R.W. (2000). Membrane technology and applications. New York, NY: McGraw-Hill. pp. 87-153.

Baskharone E.A., "Principles of Turbomachinery in Air-Breathing Engines," Cambridge University Press, 2006, pp. 261-263.

Berton, J.J. and Guynn, M.D. (2012). Multi-objective optimization of a turbofan for an advanced, single-aisle transport. NASA/TM-2012-217428. pp. 1-26.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Bijewitz, J., Seitz, A., Hornung, M., and Luftfahrt, B. (2014). Architectural comparison of advanced ultra-high bypass ratio turbofans for medium to long range application. Deutscher Luft-und Raumfahrtkongress 2014. pp. 1-12.

Bloomer, H.E. and Loeffler, I.J. (1982). QCSEE over-the-wing engine acoustic data. NASA-TM-82708. May 1, 1982. pp. 1-558.

Bloomer, H.E. and Samanich, N.E. (1982). QCSEE under-the-wing engine acoustic data. NASA-TM-82691. May 1, 1982. pp. 1-28.

Bloomer, H.E. and Samanich, N.E. (1982). QCSEE under-the-wing enging-wing-flap aerodynamic profile characteristics. NASA-TM-82890. Sep. 1, 1982. pp. 1-48.

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

Boards of Appeal of the European Patent Office for European Patent Application No. 01992470.3, Sep. 27, 2016, 17 pages.

Boggia, S. and Rud, K.. (2005). Intercooled recuperated gas turbine engine concept. 41st AIAA/ASME/SAE/ASEE Joint Propulsion Conference & Exhibit. Tuscon, Arizona. Jul. 10-13, 2005. pp. 1-11.

Bornstein, N. (1993). Oxidation of advanced intermetallic compounds. Journal de Physique IV, 1993, 03 (C9), pp. C9-367-C9-373.

Bradley A., "Presentation: Engine Design for the Environment," Rolls-Royce, RAeS—Hamburg, Jun. 24, 2010, 64 pages.

Brennan, P.J. and Kroliczek, E.J. (1979). Heat pipe design handbook. Prepared for National Aeronautics and Space Administration by B & K Engineering, Inc. Jun. 1979. pp. 1-348.

Brief Communication from Opponent after Oral Proceedings for European Patent Application No. 13743283.7 (2809932), by Safran Aircraft Engines, dated Dec. 2, 2019.

Brief for Appellee. *Raytheon Technologies Corporation* v. *General Electric Company.* Inter Partes Review No. IPR2018-01442. Filed Sep. 23, 2020. pp. 1-68.

Brines, G.L. (1990). The turbofan of tomorrow. Mechanical Engineering: The Journal of the American Society of Mechanical Engineers, 108(8), 65-67.

International Organization for Standardization, "Calculation of Load Capacity of Spur and Helical Gears—Part 1: Basic Principles, Introduction and General Influence Factors (ISO/DIS Standard No. 6336-1)",2006.

International Preliminary Report on Patentability for International Application No. PCT/US2013/022378, dated on Aug. 14, 2014, 9 pages.

(56) References Cited

OTHER PUBLICATIONS

International Preliminary Report on Patentability for International Application No. PCT/US2013/060105, dated on Apr. 2, 2015, 6 pages.
International Preliminary Report on Patentability for International Application No. PCT/US2015/012346 dated on Aug. 4, 2016.
International Preliminary Report on Patentability for PCT Application No. PCT/US2013/034518 dated on Oct. 16, 2014.
International Preliminary Report on Patentability for PCT Application No. PCT/US2013/037675, dated on Nov. 6, 2014, 13 pages.
International Preliminary Report on Patentability of PCT Application No. PCT/US2013/023559, dated on Aug. 14, 2014, 7 pages.
International Preliminary Report on Patentability of PCT Application No. PCT/US2013/023715, dated on Aug. 14, 2014, 8 pages.
International Preliminary Report on Patentability of PCT Application No. PCT/US2013/023719, dated on Aug. 14, 2014, 6 pages.
International Preliminary Report on Patentability of PCT Application No. PCT/US2013/023724, dated on Aug. 14, 2014, 9 pages.
International Preliminary Report on Patentability of PCT Application No. PCT/US2013/023730, dated on Aug. 14, 2014, 13 pages.
International Search Report and Written Opinion for PCT Application No. PCT/US2013/021878, dated on Mar. 13, 2013, 10 pages.
International Search Report and Written Opinion for PCT Application No. PCT/US2013/022388, dated on Dec. 30, 2013.
International Search Report and Written Opinion for PCT Application No. PCT/US2013/023559 dated on Nov. 5, 2013.
International Search Report and Written Opinion for PCT Application No. PCT/US2013/023603, dated on Aug. 27, 2013, 13 pages.
International Search Report and Written Opinion for PCT Application No. PCT/US2013/023715, dated on Aug. 20, 2013, 10 pages.
International Search Report and Written Opinion for PCT Application No. PCT/US2013/023719 dated on Apr. 4, 2013.
International Search Report and Written Opinion for PCT Application No. PCT/US2013/023724, dated on Mar. 26, 2013, 11 pages.
International Search Report and Written Opinion for PCT Application No. PCT/US2013/023730, dated on Mar. 12, 2013, 14 pages.
International Search Report and Written Opinion for PCT Application No. PCT/US2013/034518, dated on Nov. 22, 2013, 8 pages.
International Search Report and Written Opinion for PCT Application No. PCT/US2013/037675 dated on Mar. 7, 2014.
International Search Report and Written Opinion for PCT Application No. PCT/US2013/060105 dated on Feb. 19, 2014.
International Search Report and Written Opinion from parent counterpart PCT Application PCT/US2013/022378, dated on Sep. 13, 2013, 10 pages.
Ivchenko—Progress AI-727M. Jane's Aero-engines, Aero-engines—Turbofan. Nov. 27, 2011.
Ivchenko—Progress D-436. Jane's Aero-engines, Aero-engines—Turbofan. Feb. 8, 2012.
Ivchenko—Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76 (1). pp. 3-28.
"Jane's Aero-Engines", Edited by Bill Gunston, Jane's Information Group Inc., Alexandria, Virginia, 2000, Issue Seven, pp. 1-67, 464-470, 475-476, 482-488, 494-508, 510-512.
Jeng, Y.- L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week & Space Technology, 148(8). p. 34-5.
Kandebo, S.W. (1998). Pratt & Whitney launches geared turbofan engine. Aviation Week & Space Technology, 148(8). p. 32-4.
Kang M.R. (2009). Measurement of vibrations of gears supported by compliant shafts. Ohio University. Retrieved Oct. 7, 2019 from https://etd.ohiolink.edu/!etd.send_fileaccession=osu1253021230&disposition=attachment.
Kapelevich, "High Gear Ratio Epicyclic Drives Analysis," Jun. 2014, American Gear Manufacturers Association, geartechnology.com , pp. 62-67.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kellner T., "The World's Largest Jet Engine is Already More Powerful than America's First Manned Space Rocket," GE Reports, May 19, 2016, [Retrieved on Oct. 12, 2017], Retrieved from the Internet: URL: https://www.ge.com/reports/the-worlds-largest-jet-engine-is-already-more-powerful-than-americas-first-manned-space-rocket/.
Kerrebrock, J.L. (1977). Aircraft engines and gas turbines. Cambridge, MA: The MIT Press, p. 11.
Kiekbusch T., et al., "A common formula for the combined torsional mesh stiffness of spur gears", 5th Australasian Congress on Applied Mechanics, ACAM 2007, Dec. 10-12, 2007, pp. 1-7.
Kjelgaard, C. (2010). Gear up for the GTF. Aircraft Technology, 105. Apr.-May 2010. pp. 86, 88, 90, 92-95.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press, p. 465.
Krantz, T.L. (1990). Experimental and analytical evaluation of efficiency of helicopter planetary stage. NASA Technical Paper. Nov. 1990. pp. 1-19.
Krauskopf, L. & Shumaker, L. (2014). GE exec says avoided geared design in jet engine battle with Pratt. Reuters. Sep. 15, 2014. http://www.reuters.com/article/us-general-electric-united-tech-engine-idUSKBN0HA2H620140915.
Krenkel, W., Naslain, R., and Schneider, H. Eds. (2001). High temperature ceramic matrix composites pp. 224-229. Weinheim, DE: Wiley-VCH Verlag GmbH.
European Search Report for Application No. EP16174051.9, dated Oct. 21, 2016, 10 pages.
European Search Report for Application No. EP16174322.4, dated Nov. 18, 2016, 9 pages.
European Search Report for Application No. EP16195861.6, dated Mar. 20, 2017, 9 pages.
European Search Report for Application No. EP16196567.8, dated Mar. 17, 2017, 8 pages.
European Search Report for Application No. EP16197349.0 dated Mar. 20, 2017, 7 pages.
European Search Report for Application No. EP16197814.3, dated Mar. 21, 2017, 9 pages.
European Search Report for Application No. EP17199484.1 dated Feb. 7, 2018.
European Search Report for Application No. EP17204160.0, dated on Mar. 22, 2018.

(56) References Cited

OTHER PUBLICATIONS

European Search Report for Application No. EP18191325.2 dated Mar. 7, 2019.
European Search Report for Application No. EP18191333.6 dated Mar. 7, 2019.
European Search Report for Application No. EP19179274.6, dated Sep. 3, 2019, 12 pages.
European Search Report for Application No. EP20162850.0 dated Aug. 18, 2020.
European Search Report for European Patent Application No. 20207411.8 mailed Mar. 4, 2021.
European Search Report for European Patent Application No. 23160056.0 mailed Oct. 20, 2023.
Extended European Search Report for Application No. EP16155413.4 dated Jul. 5, 2016.
Extended European Search Report for Application No. EP17204153.5, dated on Mar. 15, 2018.
Extended European Search Report for Application No. EP17210308.7, dated Apr. 19, 2018, 10 pages.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Fanchon, J-L. (1994). Guide de sciences et technologies industrielles. Paris, France: Nathan, AFNOR. pp. 359-360.
File History for U.S. Appl. No. 12/131,876.
Final Written Decision. *General Electric Company*, Petitioner, v. *United Technologies Corp.*, Patent Owner. IPR2018-01442. U.S. Pat. No. 9,695,751. Entered Feb. 20, 2020. pp. 1-72.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fitzpatrick G.A., et al., "Diffusion Bonding Aeroengine Components," Def Scie J , Oct. 1998 , vol. 38, Issue. 4, pp. 477-485.
Fitzpatrick G.A., et al., "The Rolls-Royce Wide Chord Fan Blade, Rolls-Royce Reporting," Mar. 19, 1987, pp. 1-19.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Foreign Copy and English Translation on the back of Opposition to European Patent No. EP3097275, granted Sep. 25, 2019, filed on behalf of Safran Aircraft Engines, dated Jul. 1, 2020.
Foreign Copy—Third Party Observation submitted by Safran for EP Application No. 14155460.0, Patent No. EP2811120, on Feb. 15, 2019, Translation to follow at a later date.
Fowler, T.W. Ed. (1989). Jet engines and propulsion systems for engineers. GE Aircraft Engines. Training and Educational Development and the University of Cincinnati for Human Resource Development. pp. 1-516.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garder W.B., "Energy efficient engine flight propulsion system preliminary analysis and design report," NASA CR-159487, 1979, pp. 1-450.
Gardner W.B. (1979). Energy efficient engine: High pressure turbine uncooled rig technology report. NASA-CR-165149. Oct. 1979, pp. 1-242.
Garret TFE731 Turbofan Engine (Cat C). Chapter 79: Lubrciation System. TTFE731 Issue 2. 2010. pp. 1-24.
Gas Turbine Technology, "Introduction to a Jet Engine", Rolls-Royce plc, Dec. 2007.
Gates, D. Bombardier flies at higher market. Seattle Times. Jul. 13, 2008. pp. C6.

GE Reports (2009). GE's breakthrough GEnx debuts at the Paris Air Show. Retrieved Jun. 6, 2009 from: http://www.gereports.com/ges-breakthrough-genx-debuts-at-the-paris-air-show/.
General Electric CF34, "Jane's Aero-Engines", Jane's by IHS Markit, Jul. 26, 2010, 24 pages.
General Electric GE90, "Jane's Aero-Engines", Jane's by IHS Markit. Nov. 1, 2010, 12 pages.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Gray D.E., et al., "Energy Efficient Engine Program Technology Benefit/Cost Study vol. II," 1983, NASA, pp. 29-43.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Grose T.K. (2013). Reshaping flight for fuel efficiency: Five technologies on the runway. National Geographic. Mar. 16, 2016. Retrieved Apr. 23, 2013 from: http://news.nationalgeographic.com/news/energy/2013/04/130423-reshaping-flight-for-fuel-efficiency.html.
Smith, C.E., Hirschkron, R., and Warren, R.E. (1981). Propulsion system study for small transport aircraft technology (STAT). Final report. NASA-CR-165330. May 1, 1981. pp. 1-216.
Smith Jr M.G., et al., "P&W propulsion systems studies results/status," National Aeronautics and Space Administration First Annual High Speed Research Workshop, May 14-16, 1991, pp. 921-948.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Statement of Appeal filed by Safran in European Patent No. EP2809931 (13743042.7) Mar. 22, 2019.
Statement of Grounds for Appeal for European Patent No. 2809931 (13743042.7) mailed Apr. 8, 2019.
Suchezky, M., and Cruzen, G.S. (2012). Variable-speed power-turbine for the large civil tilt rotor. Prepared for NASA. NASA/CR-2012-217424. Feb. 2012. pp. 1-89.
Summons to attend oral proceedings for Application No. 15777258.3 dated Feb. 1, 2021. 13 pgs.
Summons to Attend Oral Proceedings for European Application No. 13743282.9 dated Mar. 3, 2021.

(56) References Cited

OTHER PUBLICATIONS

Summons to Attend Oral Proceedings for European Application No. 17210308.7 dated Feb. 25, 2022.
Summons to Attend Oral Proceedings for European Patent Application No. 14155460.0 (2811120) mailed Oct. 15, 2021.
Summons to Attend Oral Proceedings for European Patent Application No. EP13743283.7 (Patent No. EP2809932), dated May 28, 2019.
Summons to Attend Oral Proceedings for European Patent Application No. EP13777804.9 dated Dec. 10, 2019.
Summons to attend oral proceedings for European Patent Application No. EP13777804.9, dated Jul. 7, 2020.
Summons to Attend Oral Proceedings for European Patent Application No. EP13778330.4 (EP2809922) dated Dec. 2, 2019.
Summons to Attend Oral Proceedings for European Patent Application No. EP13822569.3 (EP2841718), dated Oct. 23, 2019, 13 pages.
Summons to Attend Oral Proceedings in European Patent Application No. 13837107.5 mailed Jun. 27, 2022.
Summons to Attend Oral Proceedings in European Patent Application No. 16159312.4 dated Dec. 10, 2021.
Summons to Attend Oral Proceedings in European Patent Application No. 16174051.9 dated Dec. 10, 2021.
Summons to Attend Oral Proceedings in European Patent Application No. 20162850.0 dated Jul. 11, 2022.
Summons to Oral Proceedings for European Patent Application No. 2809931 (13743042.7) mailed May 10, 2021.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Supplementary European Search Report for Application No. EP13743282.9 dated Nov. 2, 2015.
Supplementary European Search Report for Application No. EP13775036.0 dated Sep. 7, 2015.
Supplementary European Search Report for Application No. EP13822569.3 dated Jan. 28, 2016.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds Ind. Eng. Chem., Prod. Res. Dev., vol. 17(1). 1978. pp. 86-90.
Team CCJ. Turbine blade, vane cooling—a primer. Retrieved Oct. 9, 2019 from: https://www.ccj-online.com/turbine-blade-vane-cooling-a-primer/.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (Qcsee) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
The jet engine. Rolls-Royce plc. 5th Edition. 1996. pp. 48.
The New Oxford Dictionary, Second Edition, Oxford University Press, New York, USA, 2005, p. 1400.
The Oxford English Dictionary, Second Edition, Oxford University Press, Oxford, UK, 1989, vol. XIII, pp. 150-151.
Third Party Observation submitted for EP Application No. EP16156289.7 (Patent No. EP3059393), by Rolls Royce dated Jun. 19, 2019, 5 pages.
Third Party Observations and Concise Description of Relevance of Document for U.S. Appl. No. 15/185,292 dated Jul. 5, 2018.
Third Party Observations and Concise Description of Relevance of Document for U.S. Appl. No. 15/816,487 dated Jul. 25, 2018.
Third Party Observations and Concise Description of Relevance of Document for U.S. Appl. No. 15/856,396 dated Aug. 31, 2018, 32 pages.
Third Party Observations and Concise Description of Relevance of Document for U.S. Appl. No. 15/881,240 dated Aug. 31, 2018.
Third Party Observations for EP Application No. 17199484.1 (EP3296526) dated Oct. 30, 2019 by Rolls Royce.
Third Party Observations for EP Application No. EP11250208.3 (EP2362064), filed Jul. 20, 2018, dated Jul. 26, 2018, 12 pages.
Third Party Observations for EP Application No. EP113854452.3 by Rolls Royce dated Dec. 13, 2018, mailed Jan. 2, 2019, 9 pages.
Third Party Observations for EP Application No. EP12170483.7 by Rolls-Royce dated Oct. 24, 2019.
NASA Conference Publication. (1978). CTOL transport technology. NASA-CP-2036-PT-1. Jun. 1, 1978. pp. 1-531.
NASA Conference Publication. Quiet, powered-lift propulsion. Cleveland, Ohio. Nov. 14-15, 1978. pp. 1-420.
NASA Contractor Report. Energy efficient engine component development and integration program. NASA-CR-172846. Apr. 30, 1982. pp. 1-151.
NASA, Engine Weight Model, Glenn Research Center, Retrieved from, http://www.grc.nasa.gov/WWW/K-12/airplane/turbwt.html, Mar. 11, 2016.
NASA Lewis Research Center, Quiet Clean Short HaulExperimental Engine (QCSEE) Main Reduction Gears Detailed Design Final report.NASA CR_134872, Mar. 1975. 222 pgs.
NASA, Quest for Performance: The Evolution of Modem Aircraft, Part II: The Jet Age, Chapter 10: Technology of the Jet Airplane, Turbo jet and Turbofan Systems, Dec. 2006, NASA.
Neitzel, R., Lee, R., and Chamay, A.J. (1973). Engine and installation preliminary design. Jun. 1, 1973. pp. 1-333.
Neitzel, R.E., Hirschkron, R. and Johnston, R.P. (1976). Study of unconventional aircraft engines designed for low energy consumption. NASA-CR-135136. Dec. 1, 1976. pp. 1-153.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.
Norton, M. and Karczub, D. (2003). Fundamentals of noise and vibration analysis for engineers. Press Syndicate of the University of Cambridge. New York: New York. p. 524.
Notice of Opposition by Rolls Royce of European Patent No. 2809939 (European Patent Application No. 13786893.1) dated Sep. 26, 2018, 30 pages.
Notice of Opposition for European Patent No. 2809922 (13778330.4) dated Mar. 18, 2019 by Rolls-Royce plc.
Notice of Opposition for European Patent No. 2809922 (13778330.4) dated Mar. 20, 2019 by Safran Aircraft Engines.
Notice of Opposition for European Patent No. 2809932 (13743283.7) dated Sep. 20, 2018 by Safran Aircraft Engines.
Notice of Opposition for European Patent No. 2949882 (15175205.2) dated May 23, 2018 by Safran Aircraft Engines.
Notice of Opposition for European Patent No. 2949882 (15175205.2) dated May 22, 2018 by Rolls-Royce, 18 pages.
Notice of Opposition for European Patent No. EP3051078 dated Jul. 31, 2018, 45 pages.
Notice of Opposition from Rolls Royce for Application No. 16159312.4 (Patent No. EP3045684) dated Dec. 14, 2020. 23 pgs.
Notice of Opposition from Rolls Royce for Application No. 16174051.9 (Patent No. EP3098396) dated Dec. 14, 2020. 24 pgs.

(56) References Cited

OTHER PUBLICATIONS

Notice of Opposition of European Patent Application No. EP13786893.1 (European Patent No. 2809939), by Safran Aircraft Engines, dated Sep. 20, 2018, 86 pages.
Notice of Opposition of European Patent Application No. EP13786893.1 (European Patent No. 2809939) by Safran Aircraft Engines dated Sep. 24, 2018.
Notice of Opposition of European Patent No. 2811120 (14155460.0), mailed Apr. 12, 2018 by Rolls-Royce, 74 pages.
Notice of Opposition of European Patent No. 2811120 (14155460.0), mailed Apr. 12, 2018 by Safran Aircraft Engines, 123 pages.
Notice of Opposition of European Patent No. EP2834469 by Safran Aircraft Engines dated Mar. 27, 2019. [with English translation].
Notice of Opposition of European Patent No. EP2949881, by Rolls-Royce dated May 28, 2019, 19 pages.
Notice of Opposition of European Patent No. EP2949881, by Safran Aircraft Engines, dated May 28, 2019, 87 pages.
Notice of Opposition submitted for EP Application No. 15175203.7 (Patent No. EP2949881) by Rolls Royce dated May 28, 2019.
Notice of Opposition to European Patent No. EP2809931 (EP13743042.7), United Technologies Corporation opposed by Safran Aircraft Engines dated Apr. 20, 2017. [with English translation].
Notice of Opposition to Patent No. EP2811120 (14155460.0) by Safran Aircraft Engines dated Apr. 12, 2018. [with English translation].
Oates, G.C. (Ed). (1989). Aircraft propulsion systems and technology and design. Washington, D.C.: American Institute of Aeronautics, Inc. pp. 341-344.
Opinion Under Section 74(a) for European Patent Application No. 2809922, mailed May 9, 2019.
Opposition—further submission filed for European Patent No. EP2949882, (EP Application No. 15175205.2) by Safran on Mar. 12, 2019. [with English translation].
Opposition Proceedings Rolls Submission 161593124 May 6, 2022.
Opposition Response Safran for European Patent No. 2949882 (EP Application No. 15175205.2), dated Mar. 20, 2019, 78 pages.
Oppostion Proceedings Rolls Submission 161740519 May 6, 2022.
Parametric study of STOL short-haul transport engine cycles and operational techniques to minimize community noise impact. NASA-CR-114759. Jun. 1, 1974. pp. 1-397.
Parker, R.G. and Lin, J. (2001). Modeling, modal properties, and mesh stiffness variation instabilities of planetary gears. Prepared for NASA. NASA/CR-2001-210939. May 2001. pp. 1-111.
Patent Owner's Preliminary Response in U.S. Pat. No. 8,899,915, *General Electric Company*, Petitioner, v. *United Technologies Corp.*, Patent Owner. IPR2017-00522, Entered Apr. 19, 2017. pp. 1-54.
Peters A., et al., "Ultrashort Nacelles for Low Fan Pressure Ratio Propulsors", Journal of Turbomachinery, vol. 137 (2), Sep. 10, 2014, 16 pages.
Petition for Inter Partes Review of U.S. Pat. No. 8,297,916, *General Electric Company*, Petitioner, v. *United Technologies Corporation*, Patent Owner, IPR2018-01171, May 30, 2018.
Petition for Inter Partes Review of U.S. Pat. No. 8,297,916, *General Electric Company*, Petitioner v, *United Technologies Corporation*, Patent Owner: IPR2018-01172, filed May 30, 2018, 83 pages.
Petition for Inter Partes Review of U.S. Pat. No. 8,899,915. *General Electric Company*, Petitioner, v. *United technologies Corporation*, Patent Owner. IPR2017-00522. Dec. 21, 2016, 72 pages.
Petition for Inter Partes Review of U.S. Pat. No. 9,695,751. *General Electric Company*, Petitioner, v. *United Technologies Corporation*, Patent Owner. IPR2018-01442. Filed Jul. 24, 2018.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Power Technology, "GE's H-Series Breaks 60% Fuel Efficiency Barrier", retrieved from internet https://www.power-technology.com/features/feature1084/, 2007, 8 pages.
Praisner, T.J., Grover, E., Mocanu, R., Jurek, R., and Gacek, R. (2010). Predictions of unsteady interactions between closely coupled HP and LP turbines with co- and counter-rotation. Proceedings of ASME Turbo Expo 2010. Jun. 14-18, 2018. Glasgow, UK. p. 1-10.
Pratt & Whitney PW2000, Jane's Aero-Engines: Jane's by IHS Markit, Sep. 29, 2010, 8 pages.
Pratt & Whitney PW6000, "Jane's Aero-Engines", Jane's by IHS Markit, Nov. 22, 2010, 8 pages.
Pratt & Whitney PW1100G geared turbofan engine. The Flying Engineer. Retrieved Nov. 4, 2017 from: http://theflyingengineer.com/flightdeck/pw1100g-gtf/.
Pratt & Whitney PW8000. Jane's Aero-Engines. Jane's by IHS Markit. Sep. 30, 2010.
Third Party Observations for EP Application No. EP13743282.9 (EP2809953) by Rolls-Royce dated Dec. 13, 2018.
Third Party Observations for EP Application No. EP13743282.9 (EP2809953) by Rolls-Royce dated Sep. 20, 2018, 10 pages.
Third Party Observations for EP Application No. EP13775036.0 by Rolls Royce dated Dec. 13, 2018, mailed Jan. 2, 2019, 7 pages.
Third Party Observations for EP Application No. EP13775036.0 by Rolls Royce dated Oct. 11, 2018, mailed Oct. 17, 2018, 6 pages.
Third Party Observations for EP Application No. EP13775188.9 by Rolls Royce dated Dec. 13, 2018, mailed Jan. 2, 2019, 7 pages.
Third Party Observations for EP Application No. EP13775188.9 by Rolls Royce dated Sep. 10, 2018, mailed Sep. 17, 2018, 7 pages.
Third Party Observations for EP Application No. EP13775188.9 (EP2809575), dated May 12, 2020 by Rolls Royce.
Third Party Observations for EP Application No. EP13777804.9, by Rolls Royce dated Dec. 19, 2018, mailed Jan. 2, 2019, 8 pages.
Third Party Observations for EP Application No. EP13777804.9 (EP2809940), by Rolls-Royce, dated Nov. 21, 2019, 3 pages.
Third Party Observations for EP Application No. EP13822569.3 (EP2841718) by Rolls-Royce dated Sep. 10, 2018, 9 pages.
Third Party Observations for EP Application No. EP13822569.3 (EP2841718) dated Dec. 13, 2018.
Third Party Observations for EP Application No. EP14155460.0 (EP2811120) by Rolls Royce dated Oct. 29, 2018.
Third Party Observations for EP Application No. EP16159312.4 (EP3045684), filed Jun. 22, 2018, dated Jul. 3, 2018, 16 pages.
Third Party Observations for EP Application No. EP16174051.9 (EP3098396), filed Jun. 26, 2018, dated Jul. 9, 2018, 12 pages.
Third Party Observations for EP Application No. EP17199484.1 (EP3296526), filed Jul. 5, 2018, dated Jul. 12, 2018, 26 pages.
Third Party Observations for EP Application No. EP18191325.2 (EP3608515) by Rolls Royce dated Mar. 10, 2020.
Third Party Observations for EP Application No. EP18191325.2 (EP3608515) by Rolls Royce dated Mar. 6, 2020.
Third Party Observations for EP Application No. EP18191333.6 (EP3467273) by Rolls Royce dated Mar. 9, 2020.
Third Party Observations for EP Application No. EP2809940 by Rolls Royce dated Mar. 30, 2020.
Third Party Submission and Concise Description of Relevance of Document for U.S. Appl. No. 15/881,240 dated Aug. 28, 2018, 36 pages.
Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Treager, I.E. (1995). Aircraft gas turbine engine technology, 3rd Edition. Glencoe Aviation Technology Series. McGraw-Hill. p. 445.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retrieved from: https://datathief.org/DatathiefManual.pdf pp. 1-52.

(56) References Cited

OTHER PUBLICATIONS

Turbomeca Aubisque. Jane's Aero-engines, Aero-engines—Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. A23WE, "Department of Transportation Federal Aviation Administration", Oct. 25, 2001, pp. 1-23.
Type Certificate Data Sheet No. E6NE. Department of Transportation Federal Aviation Administration. Jun. 7, 2002. pp. 1-10.
Unicom, "Flying Magazine", Nov. 2002, vol. 129, No. 11, p. 68.
U.S. Appl. No. 13/408,109, filed Feb. 29, 2012, "Geared Turbofan Architecture for Improved Thrust Density".
U.S. Appl. No. 61/494,453, Geared engine flexible mount arrangement. filed Jun. 8, 2011.
United Technologies Pratt & Whitney, Jane's Aero-Engines, Jane's by IHS Markit, Aug. 30, 2000.
U.S. Appl. No. 13/363,154, filed Jan. 31, 2012, 13 pages.
U.S. Appl. No. 13/365,288, filed Feb. 3, 2012, 20 pages.
U.S. Appl. No. 13/407,795, filed Feb. 29, 2012, 19 pages.
U.S. Appl. No. 13/410,776, filed Mar. 2, 2012, 15 pages.
U.S. Appl. No. 13/437,270, filed Apr. 2, 2012, 15 pages.
U.S. Appl. No. 13/437,290, filed Apr. 2, 2012, 15 pages.
U.S. Appl. No. 13/437,304, filed Apr. 2, 2012, 14 pages.
U.S. Appl. No. 13/445,095, filed Apr. 12, 2012, 16 pages.
U.S. Appl. No. 13/446,194, filed Apr. 13, 2012, 17 pages.
U.S. Appl. No. 13/446,312, filed Apr. 13, 2012, 16 pages.
U.S. Appl. No. 13/446,510, filed Apr. 13, 2012, 19 pages.
U.S. Appl. No. 13/455,198, filed May 25, 2012, 16 pages.
U.S. Appl. No. 13/455,235, filed Apr. 25, 2012, 18 pages.
U.S. Appl. No. 13/459,498, filed Apr. 30, 2012, 15 pages.
U.S. Appl. No. 13/483,406, filed May 30, 2012, 20 pages.
U.S. Appl. No. 13/484,589, filed May 31, 2012, 13 pages.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-157.
Deventer O.V., "Extreme Reduction—11 Million to One Gearing," Shapeways.com, [Retrieved on Nov. 13, 2017], https://www.shapeways.com/product/EQJQZEVWU/extreme-reduction-11-million-to-one-gearing.
Diagram of Prior Art V2500 and PW4090 Engines, 1 page.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
*Dr. Raymond G. Tronzo v. Biomet Inc.* 156 F.3d 1154, 1998.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Du S., "Modelling of Spur Gear Mesh Stiffness and Static Transmission Error", 1998, Proc Instn Mech Engrs, vol. 212, Part C, 11 pages.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.

EASA Type-Certificate Data Sheet for PW1500G Series Engines. Feb. 24, 2021. pp. 1-17.
"EASA Type-Certificate Data Sheet RB211 Trent 800 Series Engines," EASA, TCDS E.047, Issue 02, Oct. 10, 2013.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
Engber, M., Klaus, R., Ardey, S., Gier, J., and Waschka, W. (2007). Advanced technologies for next generation regional jets—Survey of research activities at MTU Aero Engines. Proceedings: XVIII International Symposium on Air Breathing Engines (ISABE). 18th ISABE Conference. Beijing, China. Sep. 2-7, 2007. pp. 1-11.
Engine Alliance GP7200. Jane's Aero-Engines. Jane's by IHS Markit. Jul. 12, 2010.
English Translation of Measurement and Calculation Methodology on TFE731-2, TFE731-3A and TFE731-3D Models, 14 pages.
EP Office Action for Application No. EP16159312.4, dated Oct. 16, 2018, 10 pages.
EP Office Action for Application No. EP16174051.9, dated Oct. 15, 2018, 28 pages.
EP Office Action for Application No. EP17199484.1, dated Jan. 2, 2019, 5 pages.
Epstein, A. (2015). The Pratt & Whitney PurePower Geared Turbofan engine. Academie de l'Air et de l'Espace. Paris. Sep. 2015. pp. 1-27.
European Aviation Safety Agency, Type-Certificate Data Sheet for PW1500G Series Engines, No. M.E.090, Dec. 6, 2016, pp. 1-14.
European Extended Search Report for Application No. EP19199343.5, dated Jan. 10, 2020, 8 pages.
European Search Report for Application No. EP12170479.5 dated Jun. 26, 2014.
European Search Report for Application No. EP12170483.7 dated Apr. 29, 2014.
European Search Report for Application No. EP13743042.7, dated Aug. 14, 2015, 9 pages.
European Search Report for Application No. EP13743283.7, dated Oct. 5, 2015, 8 pages.
European Search Report for Application No. EP13744335.4, dated Oct. 6, 2015, 9 pages.
European Search Report for Application No. EP13775188.9 dated Aug. 11, 2015.
European Search Report for Application No. EP13777804.9, dated Oct. 20, 2015, 9 pages.
European Search Report for Application No. EP13778330.4, dated Oct. 15, 2015, 7 pages.
European Search Report for Application No. EP13786893.1 dated Oct. 12, 2015, 7 pages.
European Search Report for Application No. EP13828967.3, dated Oct. 14, 2014, 3 pages.
European Search Report for Application No. EP14155460.0, dated Sep. 2, 2014, 9 pages.
European Search Report for Application No. EP15152745.4, dated Jun. 15, 2015, 7 pages.
European Search Report for Application No. EP15175203.7 dated Oct. 15, 2015.
European Search Report for Application No. EP15175205.2 dated Oct. 15, 2015.
European Search Report for Application No. EP15199577.6, dated May 4, 2016, 10 pages.
European Search Report for Application No. EP15199916.6, dated May 4, 2016, 9 pages.
European Search Report for Application No. EP15777258.3 dated Apr. 10, 2017.
European Search Report for Application No. EP16150651.4, dated May 24, 2016, 7 pages.
European Search Report for Application No. EP16159312.4 dated Jun. 8, 2016.
European Search Report for Application No. EP16161464.9, dated Jul. 22, 2016, 9 pages.

(56) References Cited

OTHER PUBLICATIONS

European Search Report for Application No. EP16161484.7, dated Jul. 22, 2016, 8 pages.
European Search Report for Application No. EP16170111.5 dated Dec. 12, 2016.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Grzegorz Litak., et al., "Dynamics of a Gear System with Faults in Meshing Stiffness," Nonlinear Dynamics, Kluwer Academic Publishers, DO, vol. 41, No. 4, Sep. 1, 2005, pp. 415-421.
Guha, "Optimum Fan Pressure Ratio for Bypass Engines with Separate or Mixed Exhaust Streams", Journal of Propulsion and Power, vol. 17, No. 5. Sep.-Oct. 2001, pp. 1117-1122, [retrieved on Aug. 21, 2013]. Retrieved from the Internet: http://www.facweb.iitkgp,ernet.in/.about.aguha/research/AIAA2001-.pdf>entire document.
Gunston B., "Allied Signal TFE731," Jane's Aero Engine Issue Five, Mar. 1999.
Gunston, B. (Ed.) (2000). Jane's aero-engines, Issue seven. Coulsdon, Surrey, UK: Jane's Information Group Limited. pp. 510-512.
Gunston, B. (Ed.)(2000). Jane's aero-engines. Jane's Information Group Inc. VA: Alexandria. Issue Seven pp. 1-47 and 510-512.
Gunston B., "Jane's Aero-engines", Issue Seven, Janes Information Group Inc, Alexandria, Virgina, 2000, pp. 1-47, 61, 464-512.
Gunston B., "Pratt & Whitney PW6000," Jane's Aero Engine Issue Six, Sep. 1999.
Gunston B., "The Cambridge Aerospace Dictionary," Second Edition, Cambridge University Press, Cambridge, UK, 2009, p. 543.
Guynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Halle J.E., et al., "Energy Efficient Engine Fan Component Detailed Design Report," NASA-CR-165466, 1984, pp. 1-135.
Halliwell, I and Justice, K. (2012). Fuel burn benefits of a variable-pitch geared fan engine. AIAA 2012-3912. 48th AIAA/ASME/SAE/ASEE Joint Propulsion Conference & Exhibit. Jul. 30-Aug. 1, 2012. pp. 1-24.
Han, J., Dutta, S., and Ekkad, S.V. (2000). Gas turbine heat transfer and cooling technology. New York, NY: Taylor & Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp. 1-13.
Hendricks E.S., Jones, S.M., and Gray, J.S. (2014). Design optimization of a variable-speed power-turbine. American Institute of Aeronautics and Astronautics. pp. 1-17.
Hess, C. (1998). Pratt & Whitney develops geared turbofan. Flug Revue 43(7). Oct. 1998.
Hicks R.J., et al., "Optimised Gearbox Design for Modern Wind Turbines," Orbital2 Ltd, Wales, UK, Nov. 20, 2014, pp. 1-8.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Holcombe, V. (2003). Aero-Propulsion Technology (APT) task V low noise ADP engine definition study. NASA CR-2003-212521. Oct. 1, 2003. pp. 1-73.
Holder's Response to Written Opinion of Sep. 29, 2015, European Patent Application No. 15175205.2 (2949882), mailed Jun. 1, 2016, 27 pages.
Honeywell Learjet 31 and 35/36 TFE731-2 to 2C Engine Upgrade Program. Sep. 2005. pp. 1-4.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Honeywell LF507. Jane's Aero-engines, Aero-engines—Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines—Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH & Co. KGaA. pp. 1-24.
Howard, D.F. (1976). QCSEE preliminary under the wing flight propulsion system analysis report. NASA CR-134868. Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Howe, D.C., and Wynosky, T.A. (1985). Energy efficient engine program advanced turbofan nacelle definition study. NASA-CR-174942. May 1985. pp. 1-60.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
Interlocutory decision in opposition proceedings for European Patent Application No. 13743042.7 mailed Nov. 26, 2018.

(56) References Cited

OTHER PUBLICATIONS

Interlocutory decision in opposition proceedings for European Patent Application No. 13778330.4 mailed May 17, 2021.

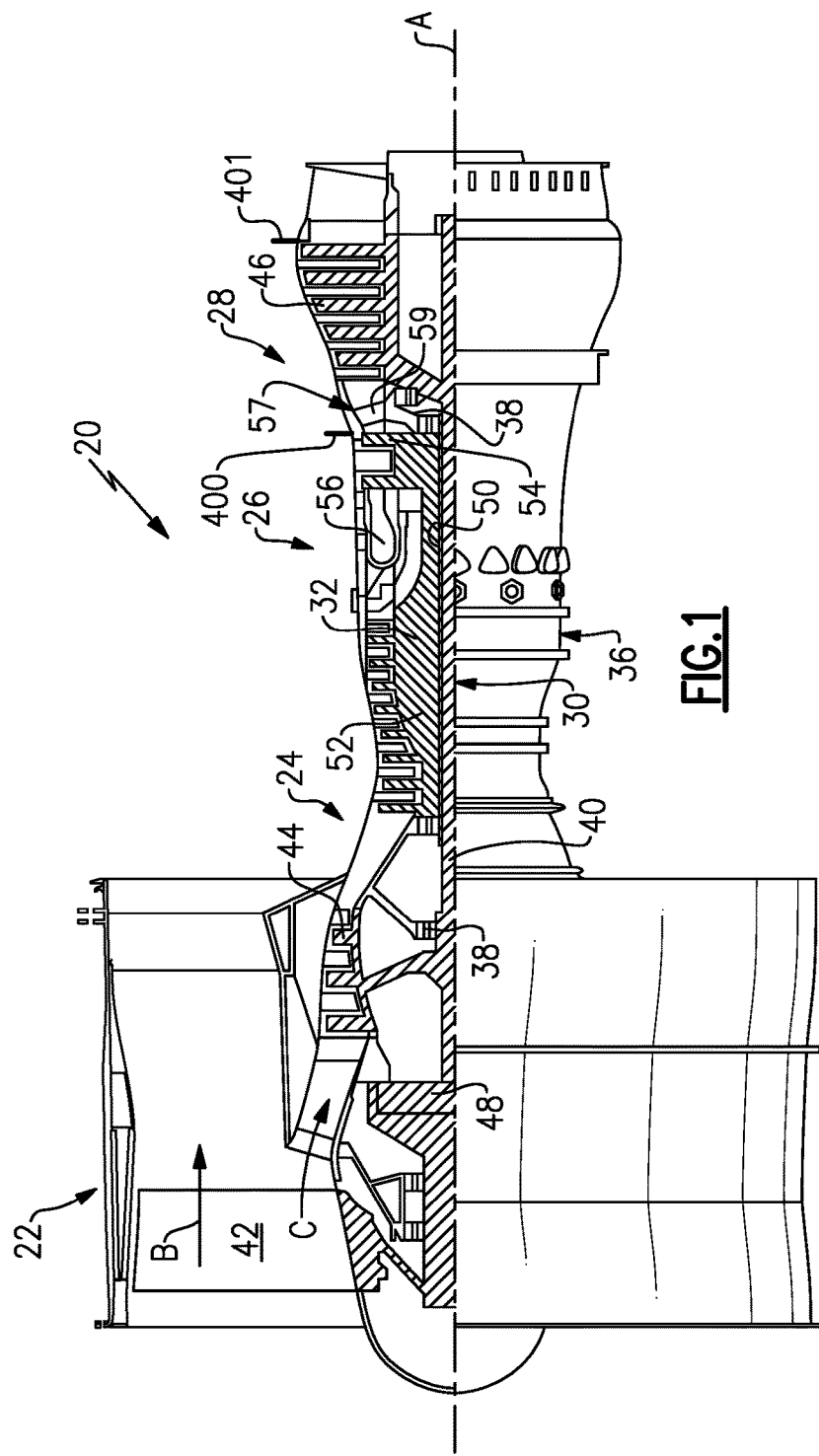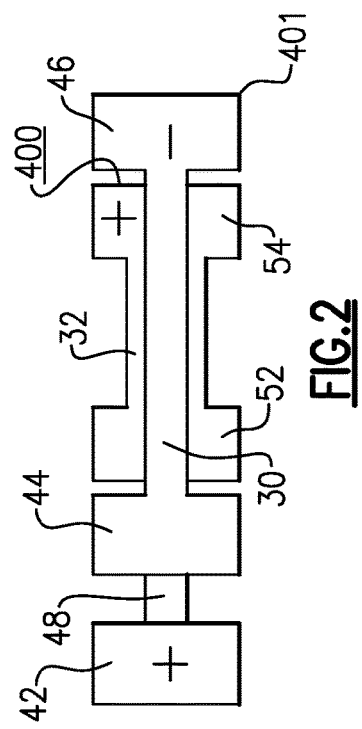

GAS TURBINE ENGINE WITH HIGH SPEED LOW PRESSURE TURBINE SECTION AND BEARING SUPPORT FEATURES

CROSS-REFERENCE TO RELATED APPLICATION

This application is a continuation of application is a continuation of U.S. patent application Ser. No. 18/104,375 filed Feb. 1, 2023, which is a continuation of U.S. patent application Ser. No. 16/227,271 filed Dec. 20, 2018, which is a continuation of U.S. patent application Ser. No. 15/478,706 filed Apr. 4, 2017, which is a continuation-in-part of U.S. patent application Ser. No. 13/446,510 filed Apr. 13, 2012, which claims priority to U.S. Provisional Application No. 61/619,124, filed Apr. 2, 2012, and is a continuation-in-part of U.S. patent application Ser. No. 13/363,154, filed on Jan. 31, 2012 and entitled "Gas Turbine Engine With High Speed Low Pressure Turbine Section."

BACKGROUND OF THE INVENTION

This application relates to a gas turbine engine wherein the low pressure turbine section is rotating at a higher speed and centrifugal pull stress relative to the high pressure turbine section speed and centrifugal pull stress than prior art engines.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section.

Traditionally, on many prior art engines the low pressure turbine section has driven both the low pressure compressor section and a fan directly. As fuel consumption improves with larger fan diameters relative to core diameters it has been the trend in the industry to increase fan diameters. However, as the fan diameter is increased, high fan blade tip speeds may result in a decrease in efficiency due to compressibility effects. Accordingly, the fan speed, and thus the speed of the low pressure compressor section and low pressure turbine section (both of which historically have been coupled to the fan via the low pressure spool), have been a design constraint. More recently, gear reductions have been proposed between the low pressure spool (low pressure compressor section and low pressure turbine section) and the fan.

SUMMARY

A gas turbine engine according to an example of the present disclosure includes a turbine section that has a fan drive turbine and a second turbine, and a gear system with a gear reduction. The fan drive turbine drives a fan through the gear system, and a gear ratio of the gear reduction being greater than 2. A mid-turbine frame is positioned intermediate the fan drive turbine and the second turbine. The fan drive turbine has a first exit area at a first exit point and is rotatable at a first speed. The second turbine has a second exit area at a second exit point and is rotatable at a second speed, and the second speed is faster than the first speed. A first performance quantity is defined as the product of the first speed squared and the first area, a second performance quantity is defined as the product of the second speed squared and the second area, and a performance ratio of the first performance quantity to the second performance quantity is between 0.8 and 1.5.

In a further embodiment of any of the foregoing embodiments, the fan drive turbine is a 3-stage to 6-stage turbine, and the second turbine is a 2-stage turbine.

In a further embodiment of any of the foregoing embodiments, the fan drive turbine includes an inlet, an outlet, and a fan drive turbine pressure ratio greater than 5. The fan drive turbine pressure ratio is a ratio of a pressure measured prior to the inlet as related to a pressure at the outlet prior to any exhaust nozzle.

In a further embodiment of any of the foregoing embodiments, a bypass ratio is greater than 10. The fan includes a plurality of fan blades, a fan pressure ratio across the fan blades being less than 1.45, measured across the fan blades alone.

A further embodiment of any of the foregoing embodiments include a compressor section including a low pressure compressor having 3 stages.

In a further embodiment of any of the foregoing embodiments, the mid-turbine frame includes a guide vane positioned intermediate the fan drive turbine and the second turbine.

In a further embodiment of any of the foregoing embodiments, the first speed is greater than 10,000 RPM.

In a further embodiment of any of the foregoing embodiments, the second speed is greater than 20,000 RPM.

In a further embodiment of any of the foregoing embodiments, the fan has fewer than 26 fan blades, and the performance ratio is greater than or equal to 1.0.

A further embodiment of any of the foregoing embodiments includes a compressor section including a low pressure compressor, the fan and the low pressure compressor being rotatable at a common speed.

In a further embodiment of any of the foregoing embodiments, the fan drive turbine and the second turbine are rotatable in opposed directions. The mid-turbine frame includes a guide vane positioned intermediate the fan drive turbine and the second turbine, and the guide vane is an air turning guide vane.

In a further embodiment of any of the foregoing embodiments, the mid-turbine frame has a first bearing supporting a first shaft rotatable with the fan drive turbine in an overhung manner.

In a further embodiment of any of the foregoing embodiments, the mid-turbine frame includes a plurality of airfoils in a core airflow path.

In a further embodiment of any of the foregoing embodiments, the second speed is greater than twice the first speed.

In a further embodiment of any of the foregoing embodiments, the fan blades have a fan tip speed of less than 1150 ft/second, and the gear system is a planetary gear system.

A further embodiment of any of the foregoing embodiments includes a compressor section including a low compressor having 3 stages.

A further embodiment of any of the foregoing embodiments includes a fan drive shaft interconnecting the gear system and the fan. A frame supports at least a portion of the fan drive shaft. The frame defines a frame transverse stiffness. A flexible support at least partially supports the gear system. The flexible support defines a support transverse stiffness with respect to the frame transverse stiffness, and the support transverse stiffness is less than about 50% of the frame transverse stiffness.

A further embodiment of any of the foregoing embodiments includes a compressor section including a first compressor, and the gear reduction is positioned between the fan drive turbine and the first compressor such that the fan and the first compressor are rotatable at a common speed.

A further embodiment of any of the foregoing embodiments includes a fan drive shaft interconnecting the gear system and the fan. A frame supports at least a portion of the fan drive shaft. The frame defines a frame transverse stiffness. A flexible support at least partially supporting the gear system. The flexible support defines a support transverse stiffness with respect to the frame transverse stiffness, and the support transverse stiffness is less than about 50% of the frame transverse stiffness.

In a further embodiment of any of the foregoing embodiments, the mid-turbine frame includes a guide vane positioned intermediate the fan drive turbine and the second turbine.

In a further embodiment of any of the foregoing embodiments, the fan drive turbine and second turbine are rotatable in opposed directions, and the guide vane is an air turning guide vane.

In a further embodiment of any of the foregoing embodiments, the mid-turbine frame has a first bearing supports a first shaft rotatable with the fan drive turbine in an overhung manner.

In a further embodiment of any of the foregoing embodiments, the mid-turbine frame includes a plurality of airfoils in a core airflow path.

In a further embodiment of any of the foregoing embodiments, the performance ratio is greater than or equal to 1.0.

In a further embodiment of any of the foregoing embodiments, the second speed is greater than 20,000 RPM, and wherein the second speed is greater than twice the first speed.

In a further embodiment of any of the foregoing embodiments, the performance ratio is greater than or equal to 1.0, the second speed is greater than twice the first speed, the fan has fewer than 26 fan blades, the fan blades have a fan tip speed of less than 1150 ft/second, and the gear system is a planetary gear system.

In a further embodiment of any of the foregoing embodiments, the turbine section drives a compressor section that has a first compressor. The gear system is straddle-mounted by bearings, and the gear system is intermediate the fan drive turbine and the first compressor such that the fan and the first compressor are rotatable at a common speed.

A further embodiment of any of the foregoing embodiments include a fan drive shaft interconnecting the gear system and the fan. A frame supports at least a portion of the fan drive shaft. The frame defines a frame transverse stiffness and a frame lateral stiffness. A flexible support at least partially supports the gear system. The flexible support defines a support transverse stiffness with respect to the frame transverse stiffness and a support lateral stiffness with respect to the frame lateral stiffness. The support transverse stiffness is less than about 80% of the frame transverse stiffness. The support lateral stiffness is less than about 80% of the frame lateral stiffness.

In a further embodiment of any of the foregoing embodiments, the support transverse stiffness is less than about 50% of the frame transverse stiffness, and the support lateral stiffness is less than about 50% of the frame lateral stiffness.

In a further embodiment of any of the foregoing embodiments, the gear system is straddle-mounted by bearings.

In a featured embodiment, a turbine section of a gas turbine engine has a fan drive and second turbine sections. The fan drive turbine section has a first exit area at a first exit point and is configured to rotate at a first speed. The second turbine section has a second exit area at a second exit point and rotates at a second speed, which is faster than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. A mid-turbine frame is positioned intermediate the fan drive and second turbine sections, and has a first bearing supporting an outer periphery of a first shaft rotating with the second turbine section.

In another embodiment according to the previous embodiment, the mid-turbine frame also includes a second bearing supporting an outer periphery of a second shaft rotating with the fan drive turbine section. The second bearing supports an intermediate portion of the second spool.

In another embodiment according to any of the previous embodiments, the ratio is above or equal to about 0.8.

In another embodiment according to any of the previous embodiments, the fan drive turbine section has at least 3 stages.

In another embodiment according to any of the previous embodiments, the fan drive turbine section has up to 6 stages.

In another embodiment according to any of the previous embodiments, the second turbine section has 2 or fewer stages.

In another embodiment according to any of the previous embodiments, a pressure ratio across the fan drive turbine section is greater than about 5:1.

In another embodiment according to any of the previous embodiments, the mid-turbine frame is provided with a guide vane positioned intermediate the fan drive and second turbine sections.

In another embodiment according to any of the previous embodiments, the fan drive and second turbine sections will rotate in opposed directions. The guide vane is a turning guide vane.

In another featured embodiment, a gas turbine engine has a fan, a compressor section in fluid communication with the fan, a combustion section in fluid communication with the compressor section, and a turbine section in fluid communication with the combustion section. The turbine section includes a fan drive turbine section and a second turbine section. The fan drive turbine section has a first exit area at a first exit point and is configured to rotate at a first speed. The second turbine section has a second exit area at a second exit point and rotates at a second speed, which is higher than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. The second turbine section is supported by a first bearing in a mid-turbine frame.

In another embodiment according to the previous embodiment, the ratio is above or equal to about 0.8.

In another embodiment according to any of the previous embodiments, the compressor section includes first and second compressor sections. The fan drive turbine section and the first compressor section will rotate in a first direction. The second turbine section and the second compressor section will rotate in a second opposed direction.

In another embodiment according to any of the previous embodiments, a gear reduction is included between the fan and a shaft driven by the fan drive turbine section such that the fan will rotate at a lower speed than the fan drive turbine section.

In another embodiment according to any of the previous embodiments, the second turbine section and second compressor section are straddle-mounted by bearings supported on an outer periphery of a shaft rotating with the second compressor section and the second turbine section.

In another embodiment according to any of the previous embodiments, the mid-turbine frame further includes a second bearing supporting an outer periphery of a shaft rotating with the fan drive turbine section.

In another embodiment according to any of the previous embodiments, the second bearing supports an intermediate portion of a shaft that will rotate with the fan drive turbine section and the first compressor section.

In another featured embodiment, a gas turbine engine has a fan, a compressor section in fluid communication with the fan, a combustion section in fluid communication with the compressor section, and a turbine section in fluid communication with the combustion section. The turbine section includes fan drive and second turbine sections. The fan drive turbine section has a first exit area at a first exit point and is configured to rotate at a first speed. The second turbine section has a second exit area at a second exit point and rotates at a second speed, which is higher than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. The compressor section includes first and second compressor sections, where the fan drive turbine section and the first compressor section will rotate in a first direction and the second turbine section and the second compressor section will rotate in a second opposed direction. A gear reduction is included between the fan and the first compressor section, such that the fan will rotate at a lower speed than the fan drive turbine section, and in the second opposed direction. A gear ratio of the gear reduction is greater than about 2.3.

In another embodiment according to the previous embodiment, the ratio is above or equal to about 0.8.

In another embodiment according to any of the previous embodiments, a mid-turbine frame is positioned intermediate the fan drive and second turbine sections. The mid-turbine frame has a first bearing supporting an outer periphery of a first shaft rotating with the second turbine section.

In another embodiment according to any of the previous embodiments, the first shaft is supported on a second bearing on its outer periphery, with the second bearing mounted to static structure.

These and other features of this disclosure will be better understood upon reading the following specification and drawings, the following of which is a brief description.

BRIEF DESCRIPTION OF THE DRAWINGS

FIG. 1 shows a gas turbine engine.

FIG. 2 schematically shows the arrangement of the low and high spool, along with the fan drive.

DETAILED DESCRIPTION

Figure 3:
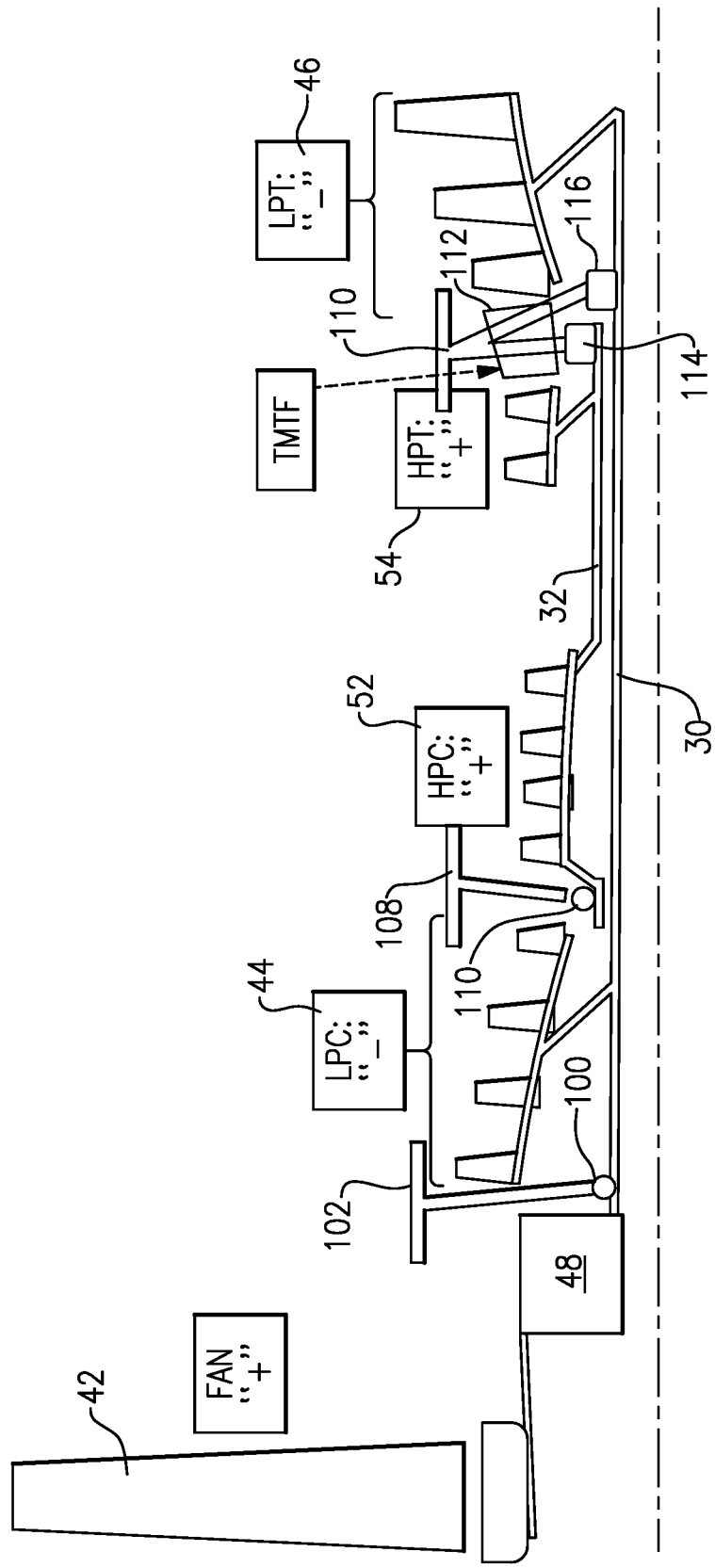
FIG. 3 shows a schematic view of a mount arrangement for an engine such as shown in FIGS. 1 and 2.

FIG. 1 schematically illustrates a gas turbine engine 20. The gas turbine engine 20 is disclosed herein as a two-turbine turbofan that generally incorporates a fan section 22, a compressor section 24, a combustor section 26 and a turbine section 28. Alternative engines might include an augmentor section (not shown) among other systems or features. The fan section 22 drives air along a bypass flow path B while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-turbine architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an innermost shaft 40 that interconnects a fan 42, a low pressure (or first) compressor section 44 and a low pressure (or first) turbine section 46. Note, turbine section 46 will also be called a fan drive turbine section. The inner shaft 40 is connected to the fan 42 through a geared architecture 48 to drive the fan 42 at a lower speed than the fan drive turbine 46. The high speed spool 32 includes a more outer shaft 50 that interconnects a high pressure (or second) compressor section 52 and high pressure (or second) turbine section 54. A combustor 56 is arranged between the high pressure compressor section 52 and the high pressure turbine section 54. A mid-turbine frame 57 of the engine static structure 36 is arranged generally between the high pressure turbine section 54 and the low pressure turbine section 46. The mid-turbine frame 57 further supports bearing systems 38 in the turbine section 28. As used herein, the high pressure turbine section experiences higher pressures than the low pressure turbine section. A low pressure turbine section is a section that powers a fan 42. The inner shaft 40 and the outer shaft 50 are concentric and rotate via bearing systems 38 about the engine central longitudinal axis A which is collinear with their longitudinal axes. The high and low spools can be either co-rotating or counter-rotating.

The core airflow C is compressed by the low pressure compressor section 44 then the high pressure compressor section 52, mixed and burned with fuel in the combustor 56, then expanded over the high pressure turbine section 54 and low pressure turbine section 46. The mid-turbine frame 57 includes airfoils 59 (one shown in FIG. 1) which are in the core airflow path. The turbine sections 46, 54 rotationally drive the respective low speed spool 30 and high speed spool 32 in response to the expansion.

The engine 20 in one example is a high-bypass geared aircraft engine. The bypass ratio is the amount of air delivered into bypass path B divided by the amount of air into core path C. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine section 46 has a pressure ratio that is greater than about 5. In some embodiments, the bypass ratio is less than or equal to about 22.0, and the gear reduction is less than or equal to about 4.5. In one disclosed embodiment, the engine 20 bypass ratio is greater than about ten (10:1), the fan diameter is significantly larger than that of the low pressure compressor section 44, and the low pressure turbine section 46 has a pressure ratio that is greater than about 5:1. In some embodiments, the low pressure turbine section 46 has a pressure ratio that is less than or equal to about 30. In some embodiments, the high pressure turbine section may have two or fewer stages. In contrast, the low pressure turbine section 46, in some embodiments, has between 3 and 6 stages. Further the low pressure turbine section 46 pressure ratio is total pressure measured prior to inlet of low pressure turbine section 46 as related to the total pressure at the outlet of the low pressure turbine section 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")". TSFC is the industry standard parameter of the rate of lbm of fuel being burned per hour divided by lbf of thrust the engine produces at that flight condition. "Low fan pressure ratio" is the ratio of total pressure across the fan blade alone, before the fan exit guide vanes. The low fan pressure ratio as disclosed herein according to one non-limiting embodiment is less than about 1.45, and is greater than or equal to about 1.1. "Low corrected fan tip speed" is the actual fan tip speed in ft/sec divided by an industry standard temperature correction of [(Ram Air Temperature deg R)/518.7)^0.5]. The "Low corrected fan tip speed" as disclosed herein according to one non-limiting embodiment is less than about 1150 ft/second, and is greater than or equal to about 850 ft/second. Further, the fan 42 may have 26 or fewer blades.

An exit area 400 is shown, in FIG. 1 and FIG. 2, at the exit location for the high pressure turbine section 54 is the annular area of the last blade of turbine section 54. An exit area for the low pressure turbine section is defined at exit 401 for the low pressure turbine section and is the annular area defined by the blade of that turbine section 46. As shown in FIG. 2, the turbine engine 20 may be counter-rotating. This means that the low pressure turbine section 46 and low pressure compressor section 44 rotate in one direction ("−"), while the high pressure spool 32, including high pressure turbine section 54 and high pressure compressor section 52 rotate in an opposed ("+") direction. The gear reduction 48, which may be, for example, an epicyclic transmission (e.g., with a sun, ring, and planet gears), is selected such that the fan 42 rotates in the same direction ("+") as the high spool 32. With this arrangement, and with the other structure as set forth above, including the various quantities and operational ranges, a very high speed can be provided to the low pressure spool. Low pressure turbine section and high pressure turbine section operation are often evaluated looking at a performance quantity which is the exit area for the turbine section multiplied by its respective speed squared. This performance quantity ("PQ") is defined as:

$$PQ_{ltp} = \left(A_{ltp} \times V_{ltp}^2\right) \qquad \text{Equation 1}$$

$$PQ_{hpt} = \left(A_{htp} \times V_{htp}^2\right) \qquad \text{Equation 2}$$

where $A_{lpt}$ is the area of the low pressure turbine section at the exit thereof (e.g., at 401), where $V_{lpt}$ is the speed of the low pressure turbine section, where $A_{hpt}$ is the area of the high pressure turbine section at the exit thereof (e.g., at 400), and where $V_{hpt}$ is the speed of the low pressure turbine section.

Thus, a ratio of the performance quantity for the low pressure turbine section compared to the performance quantify for the high pressure turbine section is:

$$\left(A_{ltp} \times V_{ltp}^2\right)/\left(A_{htp} \times V_{htp}^2\right) = PQ_{ltp}/PQ_{hpt} \qquad \text{Equation 3}$$

In one turbine embodiment made according to the above design, the areas of the low and high pressure turbine sections are 557.9 in² and 90.67 in², respectively. Further, the speeds of the low and high pressure turbine sections are 10179 rpm and 24346 rpm, respectively, such that the speed of the high pressure turbine section is more than twice the speed of the low pressure section, and such that the speeds of the low and high pressure turbine sections being greater than 10000 and 20000 rpm, respective. Thus, using Equations 1 and 2 above, the performance quantities for the low and high pressure turbine sections are:

$$PQ_{ltp} = \left(A_{ltp} \times V_{ltp}^2\right) = \qquad \text{Equation 1}$$

$$(557.9 \text{ in}^2)(10179 \, rpm)^2 = 57805157673.9 \text{ in}^2 \, rpm^2$$

$$PQ_{hpt} = \left(A_{htp} \times V_{htp}^2\right) = \qquad \text{Equation 2}$$

$$(90.67 \text{ in}^2)(24346 \, rpm)^2 = 53742622009.72 \text{ in}^2 \, rpm^2$$

and using Equation 3 above, the ratio for the low pressure turbine section to the high pressure turbine section is:

$$\text{Ratio} = PQ_{ltp}/PQ_{hpt} =$$

$$57805157673.9 \text{ in}^2 \, rpm^2/53742622009.72 \text{ in}^2 \, rpm^2 = 1.075$$

In another embodiment, the ratio was about 0.5 and in another embodiment the ratio was about 1.5. With $PQ_{ltp}/PQ_{hpt}$ ratios in the 0.5 to 1.5 range, a very efficient overall gas turbine engine is achieved. More narrowly, $PQ_{ltp}/PQ_{hpt}$ ratios of above or equal to about 0.8 are more efficient. Even more narrowly, $PQ_{ltp}/PQ_{hpt}$ ratios above or equal to 1.0 are even more efficient. As a result of these $PQ_{ltp}/PQ_{hpt}$ ratios, in particular, the turbine section can be made much smaller than in the prior art, both in diameter and axial length. In addition, the efficiency of the overall engine is greatly increased.

The low pressure compressor section is also improved with this arrangement, and behaves more like a high pressure compressor section than a traditional low pressure compressor section. It is more efficient than the prior art, and can provide more compression in fewer stages. The low pressure compressor section may be made smaller in radius and shorter in length while contributing more toward achieving the overall pressure ratio design target of the engine.

As shown in FIG. 3, the engine as shown in FIGS. 1 and 2 may be mounted such that the high pressure turbine 54 is supported on a rear end by a mid-turbine frame 110. The mid-turbine frame 110 may be provided with a guide vane 112 that is an air turning vane. Since the high pressure turbine 54 and the low pressure or fan drive turbine 46 rotate in opposed directions, the use of the turning vane intermediate the two will ensure that the gases leaving the high pressure turbine 54 approach the low pressure turbine 46 traveling in the proper direction. As is clear from FIG. 3, the mid-turbine frame 110 also includes a bearing 116 which supports a shaft that rotates with the low spool 30 in an "overhung" manner. That is, the bearing 116 is at an intermediate position on the shaft, rather than adjacent the end.

Static structure 102 and 108 support other bearings 100 and 110 to support the shafts driven by spools 30 and 32 on the compressor end. The high pressure turbine 54 can be said to be "straddle-mounted" due to the bearings 110 and 114 on the outer periphery of the shaft 32.

Figure 4:
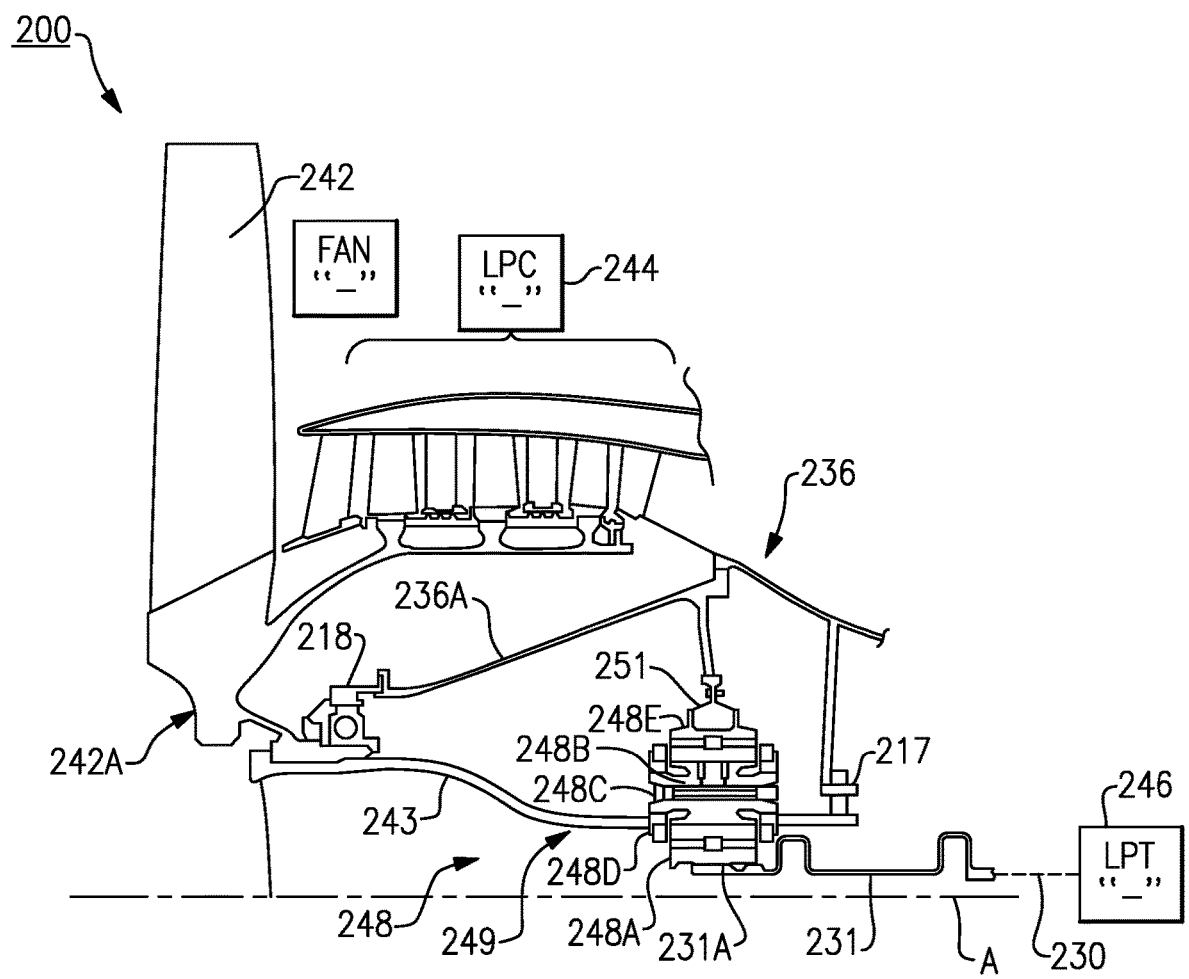
FIG. 4 shows another embodiment of a gas turbine engine.

FIG. 4 shows an embodiment 200, having a gear reduction 248 intermediate a low pressure (or first) compressor section 244 and a shaft 230 driven by a low pressure turbine section 246. Embodiment 200 can be utilized and/or combined with the features of the engine 20 as shown in FIGS. 1 to 3, for example, with like reference numerals designating like elements where appropriate and reference numerals with the addition of one-hundred or multiples thereof designating modified elements that are understood to incorporate the same features and benefits of the corresponding original elements.

The gear reduction 248 includes a sun gear 248A attached to the shaft 230. The sun gear 248A can be mounted to a flexible input 231 which is attached to the shaft 230. The gear reduction 248 can include a spline interface 231A, in which flexible input 231 has a spline which mates with and engages an inner periphery of the sun gear 248A. Accordingly, the sun gear 248A can be driven by the spline interface 231A of the flexible input 231. Surrounding the sun gear 248A is a plurality of planet gears 248B supported on bearings 248C attached to a carrier 248D mounted to a fan drive shaft 243. The planet gears 248B are surrounded on a radially outward side by a ring gear 248E. The fan drive shaft 243 interconnects an output 249 of the gear reduction 248 and the fan 242, with the fan 242 and the low pressure compressor section 244 being driven by the output 249 of the gear reduction 248. In the illustrated embodiment of FIG. 4, the output 249 is the carrier 248D of the gear reduction 248, with the carrier 248D being rotatable about the engine axis A and the ring gear 248E being fixed. The low pressure compressor 244 can be driven by the shaft 230 such that the low pressure compressor 244 and the low pressure turbine 246 are rotatable at a common speed and a common direction. In another example, the fan 242 and the low pressure compressor section 244 are coupled to the gear reduction 248 such that the fan 242 and the low pressure compressor section 244 are rotatable at different speeds and/or in different directions.

The ring gear 248E can be attached to the engine static structure 236 through a flexible support 251 which at least partially supports the gear reduction 248. The static structure 236 includes a bearing support or frame 236A which supports at least a portion of the fan drive shaft 243 via a fan shaft roller bearing 217 and a fan shaft thrust bearing 218. The gear reduction 248 connects to the fan drive shaft 243 axially forward of the fan shaft roller bearing 217 and axially rearward of the fan shaft thrust bearing 218 in order to allow the gear reduction 248 to be at least partially axially aligned with the low pressure compressor 244. Alternatively, the fan shaft roller bearings 217 could be located axially forward of the gear reduction 248 and the fan shaft thrust bearing 218 could be located axially aft of the gear reduction 248. The bearings 217 and 218 are positioned on opposite sides of the gear reduction 248 relative to engine axis A and support the gear reduction 248 in a "straddle-mounted" manner. In the illustrated embodiment of FIG. 4, the fan shaft roller bearing 217 supports an aft portion of the carrier 248D.

The frame 236A defines a frame lateral stiffness and a frame transverse stiffness. It should be understood that the term "lateral" as defined herein is generally transverse to the engine axis A, and the term "transverse" refers to a pivotal bending movement with respect to the engine axis A which typically absorbs deflection applied to the gear reduction 248. The flexible input 231 and the flexible support 251 each can be arranged to define a respective support/input lateral stiffness and a support/input transverse stiffness.

In examples, the support transverse stiffness and/or the input transverse stiffness are less than the frame transverse stiffness. In some examples, the support lateral stiffness and/or the input lateral stiffness are less than the frame transverse stiffness. In one example, both the support lateral stiffness and the input lateral stiffness are less than about 80% of the frame lateral stiffness, or more narrowly less than about 50%, with the lateral stiffness of the entire gear reduction 248 being controlled by this lateral stiffness relationship. Alternatively, or in addition to this relationship, both the support transverse stiffness and the input transverse stiffness are each less than about 80% of the frame transverse stiffness, or more narrowly between 80% and 50%, less than about 65%, or less than about 50%, with the transverse stiffness of the entire gear reduction 248 being controlled by this transverse stiffness relationship. In some examples, the support lateral stiffness and/or the input lateral stiffness are less than about 20% of the frame lateral stiffness. In other examples, the support transverse stiffness and/or the input transverse stiffness are less than about 20% of the frame transverse stiffness.

Figure 5:
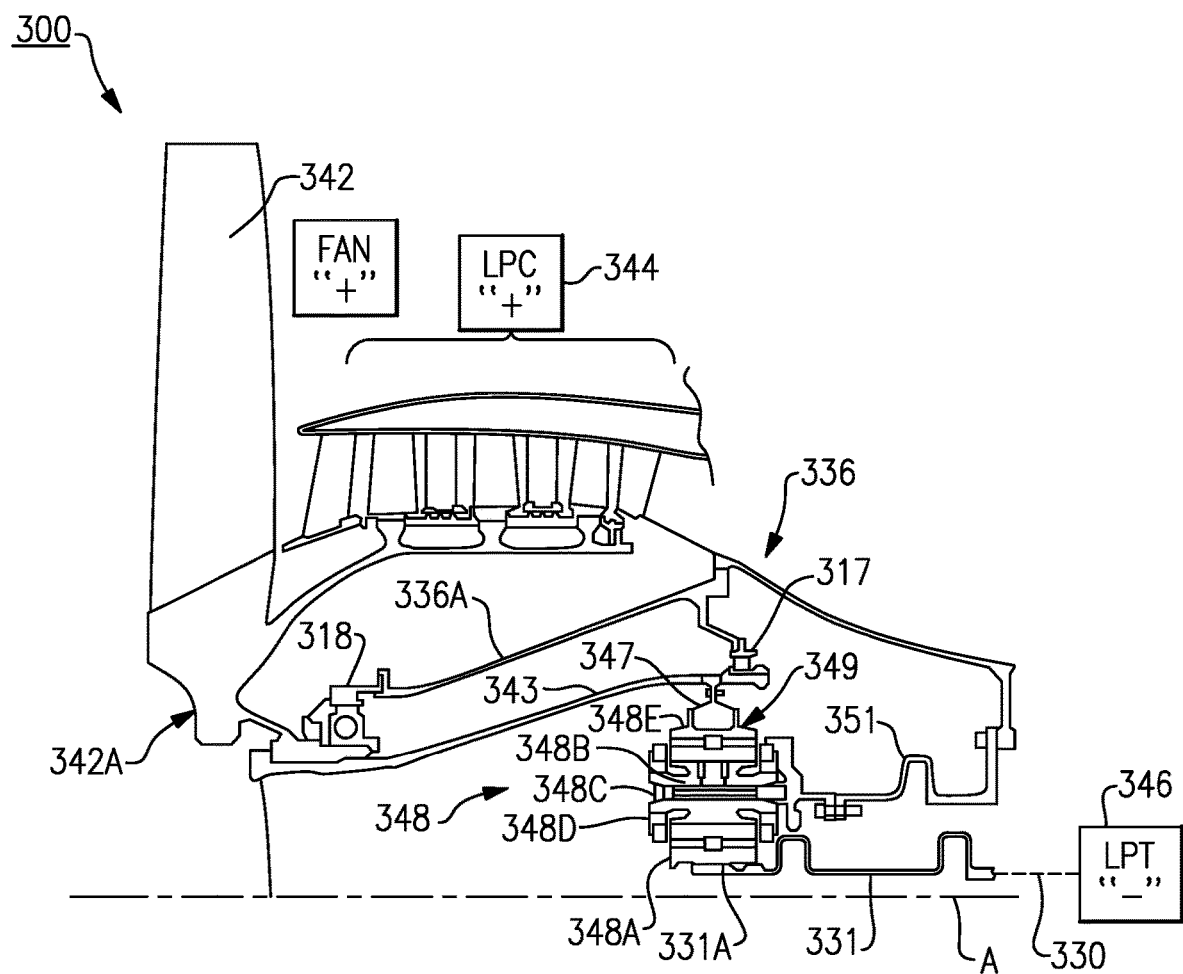
FIG. 5 shows yet another embodiment of a gas turbine engine.

FIG. 5 shows an embodiment 300 with gear reduction 348. In the illustrated example of FIG. 5, the output 349 is the ring gear 348E, with the fan drive shaft 343 mechanically attached to a fan rotor 342A of the fan 342 such that the fan 342 and the low pressure compressor section 344 are rotatable at a common speed and in a common direction. The carrier 348D is attached to the engine static structure 336 through a flexible support 351. The gear reduction 348 includes a flexible output coupling 247 which interconnects output 249 of the gear reduction 348 and the fan drive shaft 343. The flexible input 331, the flexible output coupling 347, and the flexible support 351 work together to maintain alignment of the gear reduction 348 and can facilitate the segregation of vibrations and other transients between the various components during operation of the gas turbine engine 20.

While this invention has been disclosed with reference to one embodiment, it should be understood that certain modifications would come within the scope of this invention. For that reason, the following claims should be studied to determine the true scope and content of this invention.

What is claimed is:

1. A gas turbine engine comprising:
propulsor means for providing propulsion;
first compression means for compressing airflow from the propulsor means;
second compression means for compressing airflow from the first compression means;
reduction means for reducing a rotational speed of an output that drives the propulsor means relative to an input;
first expansion means for driving the second compression means in response to expanding airflow from the second compression means;
second expansion means for driving the input of the reduction means in response to expanding airflow from the first expansion means;
wherein the reduction means includes an epicyclic gear system with a gear reduction and a gear reduction ratio of greater than 2.5:1, and the epicyclic gear system is straddle-mounted by first and second bearings on opposite sides of the gear reduction relative to an engine longitudinal axis;
wherein the first expansion means has a first exit area at a first exit point and is rotatable at a first speed, the second expansion means has a second exit area at a second exit point and is rotatable at a second speed, the first speed being greater than twice the second speed;
wherein a first performance quantity is defined as the product of the first speed squared and the first exit area, a second performance quantity is defined as the product of the second speed squared and the second exit area, and a performance ratio of the second performance quantity to the first performance quantity is between 0.8 and 1.5; and
wherein the epicyclic gear system is a planetary gear system including a sun gear, a plurality of intermediate gears surrounding the sun gear, a carrier that supports the plurality of intermediate gears, and a ring gear surrounding the plurality of intermediate gears, wherein the first bearing supports a drive shaft that interconnects the carrier and the propulsor means, the second bearing supports an aft portion of the carrier, the second bearing is axially aligned with the carrier relative to the engine longitudinal axis, and the second bearing is situated along an outer periphery of the carrier.

2. The gas turbine engine as set forth in claim 1, wherein the first and second compression means include respective pluralities of compression stages, and the first and second expansion means include respective pluralities of expansion stages.

3. The gas turbine engine as set forth in claim 2, wherein the performance ratio is between 1.0 and 1.5.

4. The gas turbine engine as set forth in claim 3, wherein:
the first compression means includes a greater number of compression stages than a total number of expansion stages of the first expansion means; and
the second expansion means includes at least three, but no more than six, expansion stages.

5. The gas turbine engine as set forth in claim 2, wherein the second bearing is axially aft of the first compression means relative to the engine longitudinal axis.

6. The gas turbine engine as set forth in claim 2, wherein the propulsor means includes a fan having a plurality of fan blades, and an outer housing surrounds the fan to define a bypass flow path.

7. The gas turbine engine as set forth in claim 6, wherein the propulsor means includes a low fan pressure ratio of less than 1.45 measured across the plurality of fan blades alone at a cruise condition at 0.8 Mach and 35,000 feet.

8. The gas turbine engine as set forth in claim 7, wherein the performance ratio is between 1.0 and 1.5, and the second expansion means drives both the first compression means and the input of the reduction means.

9. The gas turbine engine as set forth in claim 1, further comprising:
a frame supporting at least a portion of the drive shaft, the frame defining a frame transverse stiffness and a frame lateral stiffness;
a flexible support at least partially supporting the epicyclic gear system relative to a static structure, the flexible support defining a support transverse stiffness with respect to the frame transverse stiffness and a support lateral stiffness with respect to the frame lateral stiffness; and
wherein the support lateral stiffness is less than 80% of the frame lateral stiffness, and the support transverse stiffness is less than 80% of the frame transverse stiffness.

10. The gas turbine engine as set forth in claim 9, wherein the input lateral stiffness is less than 20% of the frame lateral stiffness, and the input transverse stiffness is less than 20% of the frame transverse stiffness.

11. A gas turbine engine comprising:
propulsor means for providing propulsion;
first compression means for compressing airflow from the propulsor means, wherein the first compression means includes three compression stages;
second compression means for compressing airflow from the first compression means;
reduction means for reducing a rotational speed of an output that drives the propulsor means relative to an input;
first expansion means for driving the second compression means in response to expanding airflow from the second compression means;
second expansion means for driving the input of the reduction means in response to expanding airflow from the first expansion means;
wherein the reduction means includes an epicyclic gear system with a gear reduction and a gear reduction ratio of greater than 2.5:1, wherein the epicyclic gear system includes a sun gear, a plurality of intermediate gears surrounding the sun gear, a carrier supporting the intermediate gears, and a ring gear surrounding the intermediate gears, and wherein the gear reduction is positioned between the second expansion means and the first compression means such that the propulsor means and the first compression means are rotatable at a common speed;
a drive shaft interconnecting the epicyclic gear system and the propulsor means, wherein first and second bearings are axially aligned with the drive shaft relative to an engine longitudinal axis, the first and second bearings support a periphery of the drive shaft on opposite sides of the ring gear relative to the engine longitudinal axis, and the second bearing is axially aft of the first compression means relative to the engine longitudinal axis;
wherein the first expansion means has a first exit area at a first exit point and is rotatable at a first speed, the second expansion means has a second exit area at a second exit point and is rotatable at a second speed, the first speed being greater than twice the second speed; and wherein a first performance quantity is defined as the product of the first speed squared and the first exit area, a second performance quantity is defined as the product of the second speed squared and the second exit area, and a performance ratio of the second performance quantity to the first performance quantity is no more than 1.5.

12. The gas turbine engine as set forth in claim 11, wherein the second compression means includes a pluralities of compression stages, and the first and second expansion means include respective pluralities of expansion stages.

13. The gas turbine engine as set forth in claim 11, wherein the ring gear is axially aft of the first compression means relative to the engine longitudinal axis.

14. The gas turbine engine as set forth in claim 11, wherein the drive shaft interconnects the ring gear and the propulsor means.

15. The gas turbine engine as set forth in claim 11, wherein the drive shaft interconnects the carrier and the propulsor means.

16. The gas turbine engine as set forth in claim 15, wherein the ring gear is attached to an engine static structure through a flexible support that at least partially supports the gear reduction.

17. The gas turbine engine as set forth in claim 11, wherein:

the propulsor means includes a fan having a plurality of fan blades, and an outer housing surrounds the fan to define a bypass flow path; and the propulsor means includes a low fan pressure ratio of less than 1.45 measured across the fan blades alone at a cruise condition at 0.8 Mach and 35,000 feet.

18. The gas turbine engine as set forth in claim 17, wherein the performance ratio is no more than 1.0.

* * * * *